US012610369B2

(12) United States Patent
Yoshimura et al.

(10) Patent No.: US 12,610,369 B2
(45) Date of Patent: Apr. 21, 2026

(54) TERMINAL DEVICES, BASE STATION DEVICES, AND COMMUNICATION METHODS

(71) Applicant: SHARP KABUSHIKI KAISHA, Sakai City (JP)

(72) Inventors: Tomoki Yoshimura, Sakai City (JP); Toshizo Nogami, Sakai City (JP); Shoichi Suzuki, Sakai City (JP); Daiichiro Nakashima, Sakai City (JP); Huifa Lin, Sakai City (JP); Wataru Ouchi, Sakai City (JP); Takahisa Fukui, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 513 days.

(21) Appl. No.: 18/015,297

(22) PCT Filed: Jul. 9, 2021

(86) PCT No.: PCT/JP2021/026712
§ 371 (c)(1),
(2) Date: Jan. 9, 2023

(87) PCT Pub. No.: WO2022/014691
PCT Pub. Date: Jan. 20, 2022

(65) Prior Publication Data
US 2023/0300845 A1 Sep. 21, 2023

(30) Foreign Application Priority Data
Jul. 14, 2020 (JP) ................................. 2020-120412

(51) Int. Cl.
*H04W 4/00* (2018.01)
*H04L 1/00* (2006.01)
(Continued)

(52) U.S. Cl.
CPC ........... *H04W 72/23* (2023.01); *H04L 1/0061* (2013.01); *H04L 27/2605* (2013.01); *H04W 72/1268* (2013.01)

(58) Field of Classification Search
None
See application file for complete search history.

(56) References Cited

U.S. PATENT DOCUMENTS

2021/0321400 A1* 10/2021 Takeda .................. H04L 5/0094

OTHER PUBLICATIONS

Fujitsu, "Remaining issues on UL signals and channels for NR-U", R1-2004041, 3GPP TSG RAN WG1 #101, e-Meeting, May 25-Jun. 5, 2020.
(Continued)

*Primary Examiner* — Zewdu A Beyen
(74) *Attorney, Agent, or Firm* — ScienBiziP, P.C.

(57) ABSTRACT

A terminal device comprising: a reception unit configured to detect a downlink control information (DCI) format for scheduling a physical uplink shared channel (PUSCH); a transmission unit configured to transmit the PUSCH; and a control unit configured to determine to use one of a first process for the PUSCH and a second process for the PUSCH, at least based on how the PUSCH is scheduled: wherein the first process is a resource determination process which is given based on a first configuration of multiple first resource block (RB)-sets, the second process is a resource determination process which is given based on a second configuration of multiple second RB-sets, the multiple first RB-sets and one or more first intra-cell guard bands which corresponds to the multiple first RB-sets fully occupies the carrier, and the multiple second RB-sets and one or more second intra-cell guard bands which corresponds to the multiple second RB-sets fully occupies the carrier.

3 Claims, 13 Drawing Sheets

(51) Int. Cl.
    *H04L 27/26*         (2006.01)
    *H04W 72/1268*     (2023.01)
    *H04W 72/23*       (2023.01)

(56)             References Cited

OTHER PUBLICATIONS

3GPP TS 38.214 V16.1.0 (Mar. 2020), 3rd Generation Partnership
Project; Technical Specification Group Radio Access Network; NR;
Physical layer procedures for data (Release 16).
Moderator (Ericsson), "FL Summary for [101-e-NR-unlic-NRU-
ULSignalsChannels-01] Email discussion/approval", R1-2004883,
3GPP TSG-RAN WG1 Meeting #101-e, e-Meeting, May 25-Jun. 5,
2020.

* cited by examiner

Figure 2A: Number of OFDM symbols per slot, slots per frame, and slots per subframe for normal cyclic prefix

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure 2B: Number of OFDM symbols per slot, slots per frame, and slots per subframe for extended cyclic prefix

| u | $N^{slot}_{symb}$ | $N^{frame,u}_{slot}$ | $N^{subframe,u}_{slot}$ |
|---|---|---|---|
| 2 | 12 | 40 | 4 |

Figure 2

Search space set 91

Search space set 92

Search space set 93

Search space set 94

Slot #0    Slot #1    Slot #2    Slot #3

Primary cell 301

Secondary cell 302

Secondary cell 303

| SCS (kHz) | 5MHz $N_{RB}$ | 10MHz $N_{RB}$ | 15MHz $N_{RB}$ | 20 MHz $N_{RB}$ | 25 MHz $N_{RB}$ | 30 MHz $N_{RB}$ | 40 MHz $N_{RB}$ | 50MHz $N_{RB}$ | 60 MHz $N_{RB}$ | 80 MHz $N_{RB}$ | 90 MHz $N_{RB}$ | 100 MHz $N_{RB}$ |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

Figure 11

TERMINAL DEVICES, BASE STATION DEVICES, AND COMMUNICATION METHODS

TECHNICAL FIELD

The present invention relates to a terminal device, a base station device, and a communication method.

BACKGROUND

In the 3rd Generation Partnership Project (3GPP), a radio access method and a radio network for cellular mobile communications (hereinafter, referred to as Long Term Evolution, or Evolved Universal Terrestrial Radio Access) have been studied. In LTE (Long Term Evolution), a base station device is also referred to as an evolved NodeB (eNodeB), and a terminal device is also referred to as a User Equipment (UE). LTE is a cellular communication system in which multiple areas are deployed in a cellular structure, with each of the multiple areas being covered by a base station device. A single base station device may manage multiple cells. Evolved Universal Terrestrial Radio Access is also referred as E-UTRA.

In the 3GPP, the next generation standard (New Radio: NR) has been studied in order to make a proposal to the International-Mobile-Telecommunication-2020 (IMT-2020) which is a standard for the next generation mobile communication system defined by the International Telecommunications Union (ITU). NR has been expected to satisfy a requirement considering three scenarios of enhanced Mobile BroadBand (eMBB), massive Machine Type Communication (mMTC), and Ultra Reliable and Low Latency Communication (URLLC), in a single technology framework.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

BRIEF DESCRIPTION OF THE DRAWINGS

FIG. 2 is an example showing the relationship between subcarrier-spacing configuration u, the number of OFDM symbols per slot $N^{slot}_{symb}$, and the CP configuration according to an aspect of the present embodiment;

FIG. 11 is an example configuration of a table for a maximum transmission bandwidth configuration according to an aspect of the present embodiment;

DESCRIPTION OF EMBODIMENTS floor (CX) may be a floor function for real number CX. For example, floor (CX) may be a function that provides the largest integer within a range that does not exceed the real number CX. ceil (DX) may be a ceiling function to a real number DX. For example, ceil (DX) may be a function that provides the smallest integer within the range not less than the real number DX. mod (EX, FX) may be a function that provides the remainder obtained by dividing EX by FX. mod (EX, FX) may be a function that provides a value which corresponds to the remainder of dividing EX by FX. It is exp $(GX)=e^{GX}$. Here, e is Napier number. $(HX)^{(IX)}$ indicates IX to the power of HX.

In a wireless communication system according to one aspect of the present embodiment, at least OFDM (Orthogonal Frequency Division Multiplex) is used. An OFDM symbol is a unit of time domain of the OFDM. The OFDM symbol includes at least one or more subcarriers. An OFDM symbol is converted to a time-continuous signal in baseband signal generation. In downlink, at least CP-OFDM (Cyclic Prefix-Orthogonal Frequency Division Multiplex) is used. In uplink, either CP-OFDM or DFT-s-OFDM (Discrete Fourier Transform-spread-Orthogonal Frequency Division Multiplex) is used. DFT-s-OFDM may be given by applying transform precoding to CP-OFDM. CP-OFDM is OFDM using CP (Cyclic Prefix).

The OFDM symbol may be a designation including a CP added to the OFDM symbol. That is, an OFDM symbol may be configured to include the OFDM symbol and a CP added to the OFDM symbol.

Figure 1:
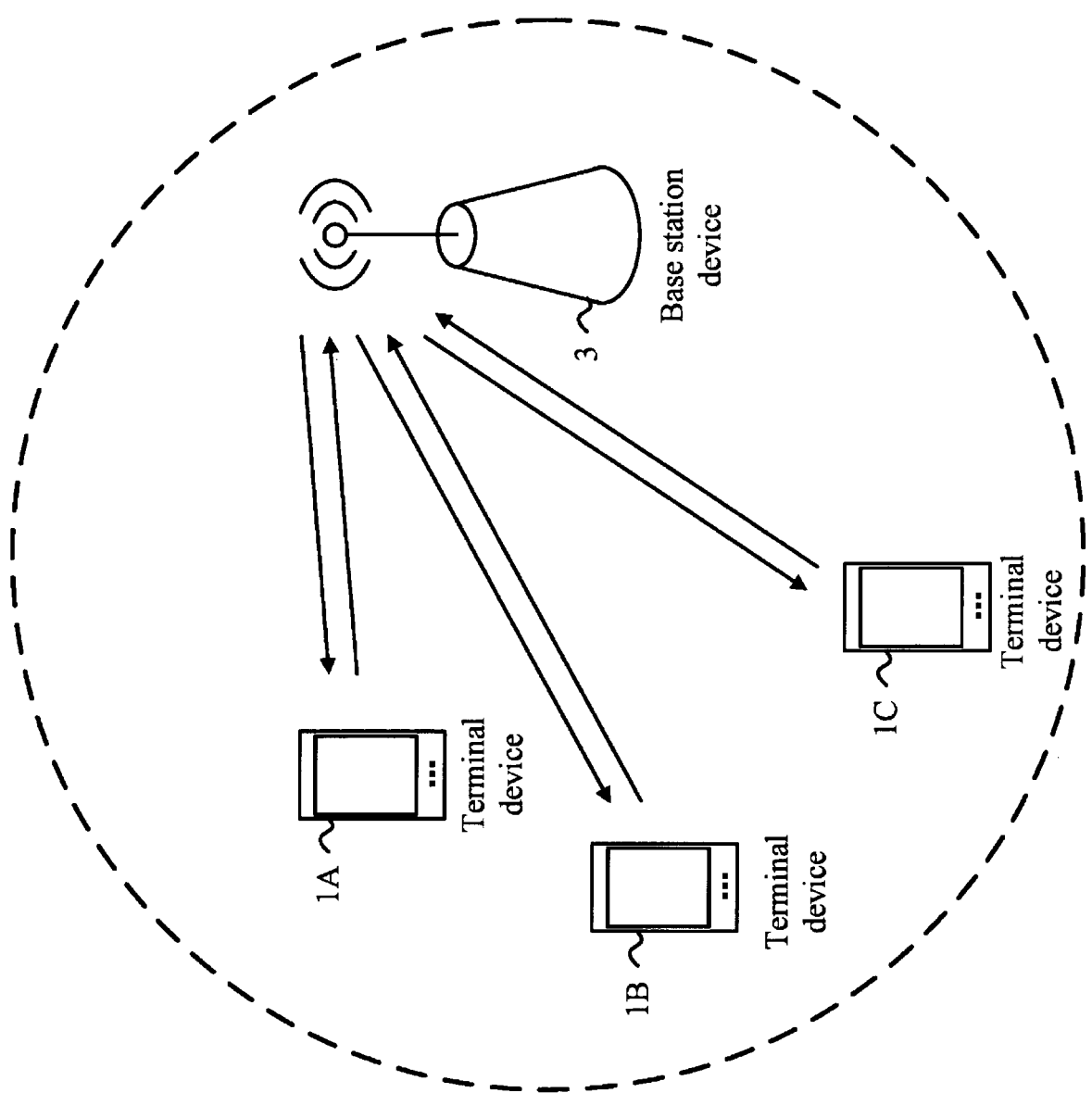
FIG. 1 is a conceptual diagram of a wireless communication system according to an aspect of the present embodiment.

FIG. 1 is a conceptual diagram of a wireless communication system according to an aspect of the present embodiment. In FIG. 1, the wireless communication system includes at least terminal device 1A to 1C and a base station device 3 (BS #3: Base station #3). Hereinafter, the terminal devices 1A to 1C are also referred to as a terminal device 1 (UE #1: User Equipment #1).

The base station device 3 may be configured to include one or more transmission devices (or transmission points, transmission devices, reception devices, transmission points, reception points). When the base station device 3 is configured by a plurality of transmission devices, each of the plurality of transmission devices may be arranged at a different position.

The base station device 3 may provide one or more serving cells. A serving cell may be defined as a set of resources used for wireless communication. A serving cell is also referred to as a cell.

A serving cell may be configured to include at least one downlink component carrier (downlink carrier) and/or one uplink component carrier (uplink carrier). A serving cell may be configured to include at least two or more downlink component carriers and/or two or more uplink component carriers. A downlink component carrier and an uplink component carrier are also referred to as component carriers (carriers).

For example, one resource grid may be provided for one component carrier. For example, one resource grid may be provided for one component carrier and a subcarrier-spacing configuration u. A subcarrier-spacing configuration u is also referred to as numerology. A resource grid includes $N^{size, u}_{grid, x} N^{RB}_{sc}$ subcarriers. The resource grid starts from a common resource block with index $N^{start, u}_{grid}$. The common resource block with the index $N^{start, u}_{grid}$ is also referred to as a reference point of the resource grid. The resource grid includes $N^{subframe, u}_{symb}$ OFDM symbols. The subscript x indicates the transmission direction, and indicates either downlink or uplink. One resource grid is provided for an antenna port p, a subcarrier-spacing configuration u, and a transmission direction x.

Resource grid is also referred to as carrier.

$N^{size, u}_{grid, x}$ and $N^{start, u}_{grid}$ are given based at least on a higher-layer parameter (e.g. referred to as higher-layer parameter CarrierBandwidth). The higher-layer parameter is used to define one or more SCS (SubCarrier-Spacing) specific carriers. One resource grid corresponds to one SCS specific carrier. One component carrier may comprise one or more SCS specific carriers. The SCS specific carrier may be included in a system information block (SIB). For each SCS specific carrier, a subcarrier-spacing configuration u may be provided.

FIG. 2 is an example showing the relationship between subcarrier-spacing configuration u, the number of OFDM symbols per slot $N^{slot}_{symb}$, and the CP configuration according to an aspect of the present embodiment. In FIG. 2A, for example, when the subcarrier-spacing configuration u is set to 2 and the CP configuration is set to normal CP (normal cyclic prefix), $N^{slot}_{symb}=14$, $N^{frame, u}_{slot}=40$, $N^{subframe, u}_{slot}=4$. Further, in FIG. 2B, for example, when the subcarrier-spacing configuration u is set to 2 and the CP configuration is set to an extended CP (extended cyclic prefix), $N^{slot}_{symb}=12$, $N^{frame, u}_{slot}=40$, $N^{subframe, u}_{slot}=4$.

In the wireless communication system according to an aspect of the present embodiment, a time unit $T_c$ may be used to represent the length of the time domain. The time unit $T_c$ is $T_c=1/(df_{max}*N_f)$. It is $df_{max}=480$ kHz. It is $N_f=4096$. The constant k is $k=df_{max}*N_f/(df_{ref}N_{f, ref})=64$. $df_{ref}$ is 15 kHz. $N_{f, ref}$ is 2048.

Transmission of signals in the downlink and/or transmission of signals in the uplink may be organized into radio frames (system frames, frames) of length $T_f$. It is $T_f=(df_{max} N_f/100)*T_s=10$ ms. One radio frame is configured to include ten subframes. The subframe length is $T_{sf}=(df_{max}N_f/1000) T_s=1$ ms. The number of OFDM symbols per subframe is $N^{subframe, u}_{symb}=N^{slot}_{symb}N^{subframe, u}_{slot}$.

For a subcarrier-spacing configuration u, the number of slots included in a subframe and indexes may be given. For example, slot index $n^u_s$ may be given in ascending order with an integer value ranging from 0 to $N^{subframe, u}_{slot}-1$ in a subframe. For subcarrier-spacing configuration u, the number of slots included in a radio frame and indexes of slots included in the radio frame may be given. Also, the slot index $n^u_{s, f}$ may be given in ascending order with an integer value ranging from 0 to $N^{frame, u}_{slot}-1$ in the radio frame. Consecutive $N^{slot}_{symb}$ OFDM symbols may be included in one slot. It is $N^{slot}_{symb}=14$.

Figure 3:
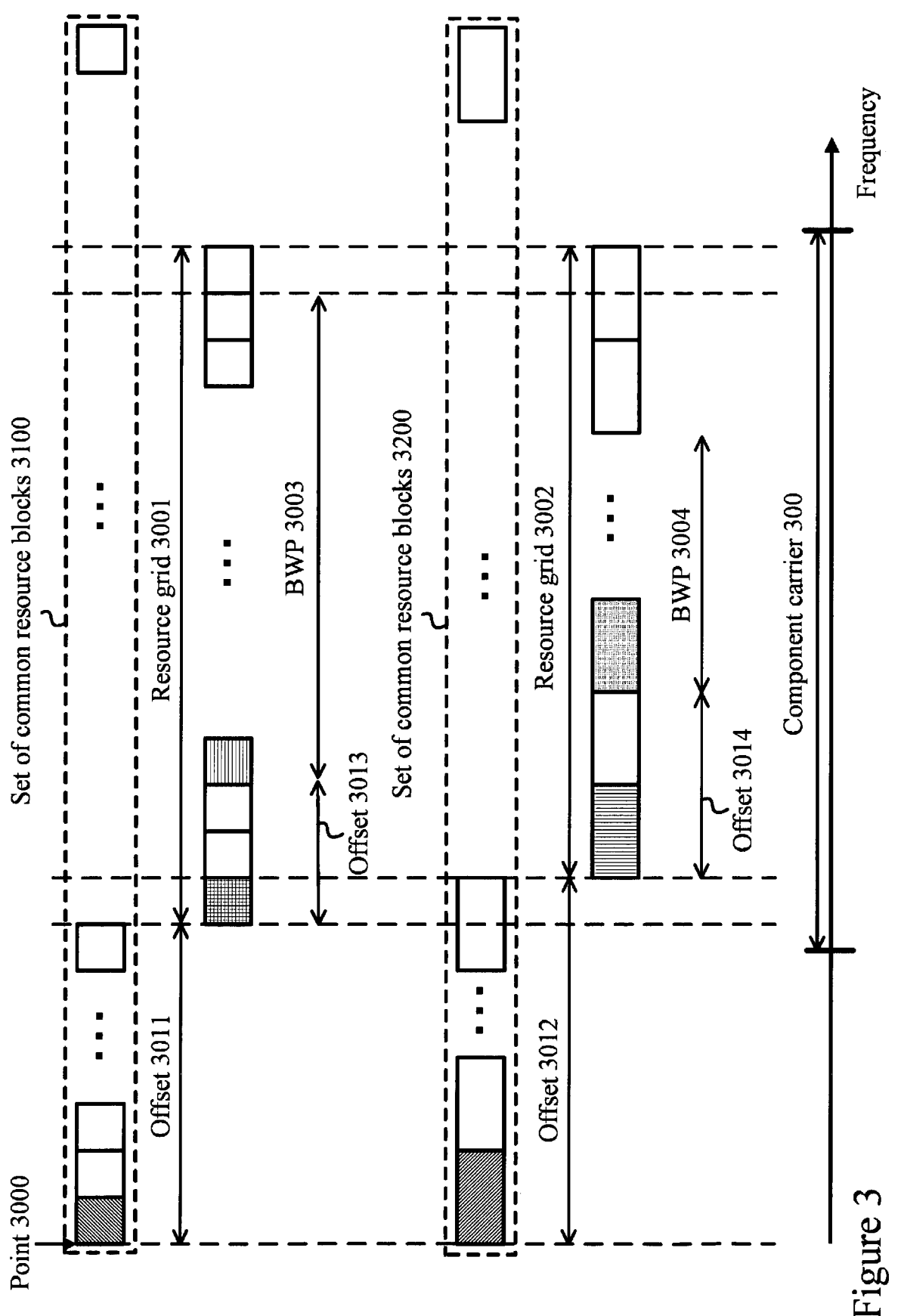
FIG. 3 is a diagram showing an example of a method of configuring a resource grid according to an aspect of the present embodiment.

FIG. 3 is a diagram showing an example of a method of configuring a resource grid according to an aspect of the present embodiment. The horizontal axis in FIG. 3 indicates frequency domain. FIG. 3 shows a configuration example of a resource grid of subcarrier-spacing configuration $u=u_1$ in the component carrier 300 and a configuration example of a resource grid of subcarrier-spacing configuration $u=u_2$ in a component carrier. One or more subcarrier-spacing configuration may be set for a component carrier. Although it is assumed in FIG. 3 that $u_1=u_2-1$, various aspects of this embodiment are not limited to the condition of $u_1=u_2-1$.

The component carrier 300 is a band having a predetermined width in the frequency domain.

Point (Point) 3000 is an identifier for identifying a subcarrier. Point 3000 is also referred to as point A. The common resource block (CRB: Common resource block) set 3100 is a set of common resource blocks for the subcarrier-spacing configuration $u_1$.

Among the common resource block-set 3100, the common resource block including the point 3000 (the block indicated by the upper right diagonal line in FIG. 3) is also referred to as a reference point of the common resource block-set 3100. The reference point of the common resource block-set 3100 may be a common resource block with index 0 in the common resource block-set 3100.

The offset 3011 is an offset from the reference point of the common resource block-set 3100 to the reference point of the resource grid 3001. The offset 3011 is indicated by the number of common resource blocks which is relative to the subcarrier-spacing configuration $u_1$. The resource grid 3001 includes $N^{size, u}_{grid1, x}$ common resource blocks starting from the reference point of the resource grid 3001.

The offset 3013 is an offset from the reference point of the resource grid 3001 to the reference point ($N^{start, u}_{BWP, i1}$) of the BWP (Band Width Part) 3003 of the index i1.

Common resource block-set 3200 is a set of common resource blocks with respect to subcarrier-spacing configuration $u_2$.

A common resource block including the point 3000 (a block indicated by a left-upward hatching in FIG. 3) in the common resource block-set 3200 is also referred to as a reference point of the common resource block-set 3200. The reference point of the common resource block-set 3200 may be a common resource block with index 0 in the common resource block-set 3200.

The offset 3012 is an offset from the reference point of the common resource block-set 3200 to the reference point of the resource grid 3002. The offset 3012 is indicated by the number of common resource blocks for subcarrier-spacing configuration $u=u_2$. The resource grid 3002 includes $N^{size, u}_{grid2, x}$ common resource blocks starting from the reference point of the resource grid 3002.

The offset 3014 is an offset from the reference point of the resource grid 3002 to the reference point ($N^{start, u}_{BWP, i2}$) of the BWP 3004 with index $i_2$.

Figure 4:
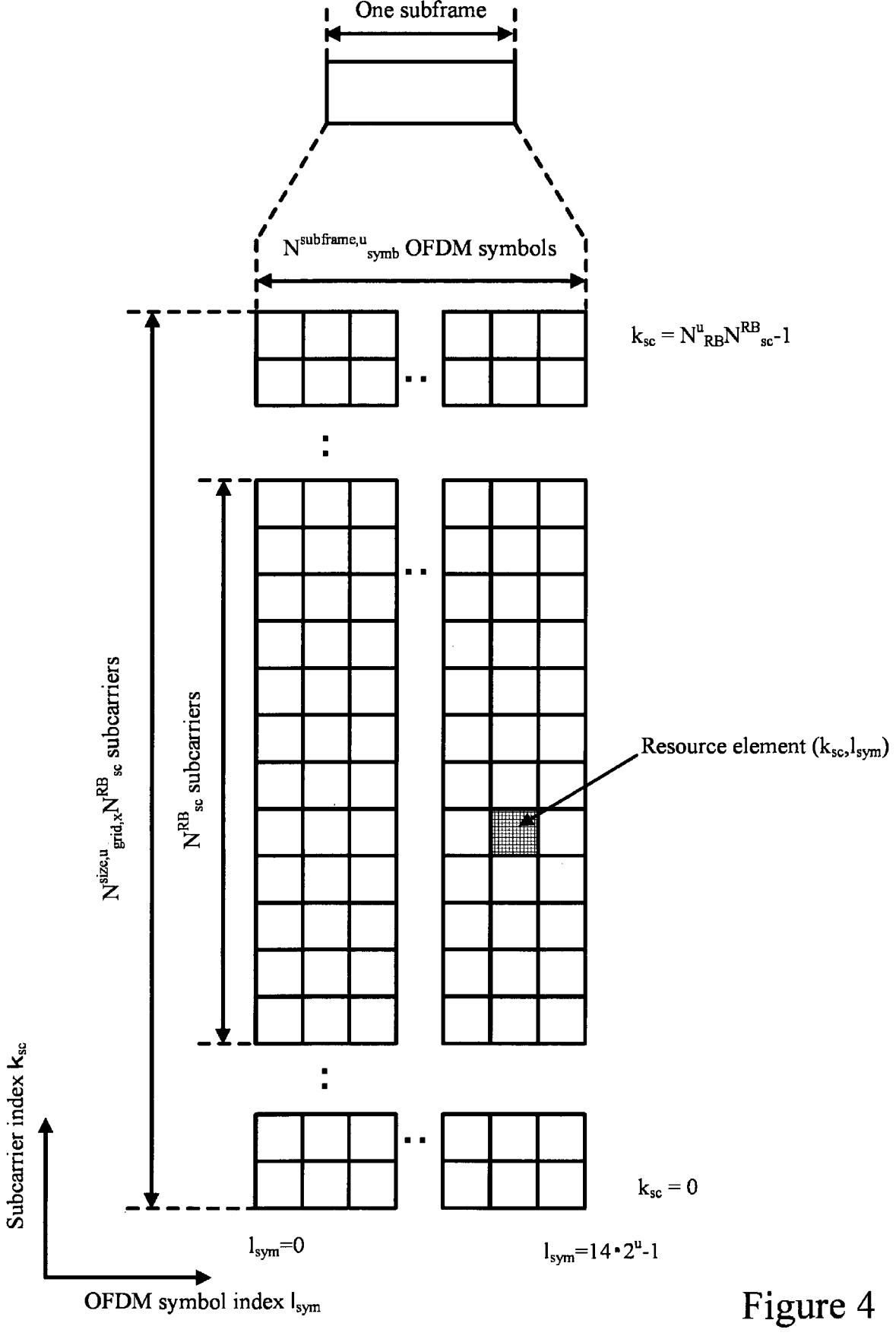
FIG. 4 is a diagram showing a configuration example of a resource grid 3001 according to an aspect of the present embodiment.

FIG. 4 is a diagram showing a configuration example of a resource grid 3001 according to an aspect of the present embodiment. In the resource grid of FIG. 4, the horizontal axis indicates OFDM symbol index $l_{sym}$, and the vertical axis indicates the subcarrier index $k_{sc}$. The resource grid 3001 includes $N^{size, u}_{grid1, x} N^{RB}_{sc}$ subcarriers, and includes $N^{subframes, u}_{symb}$ OFDM symbols. A resource specified by the subcarrier index $k_{sc}$ and the OFDM symbol index $l_{sym}$ in a resource grid is also referred to as a resource element (RE: Resource Element).

A resource block (RB: Resource Block) includes $N^{RB}_{sc}$ consecutive subcarriers. A resource block is a generic name of a common resource block, a physical resource block (PRB: Physical Resource Block), and a virtual resource block (VRB: Virtual Resource Block). It is $N^{RB}_{sc}=12$.

A resource block unit is a set of resources that corresponds to one OFDM symbol in one resource block. That is, one resource block unit includes 12 resource elements which corresponds to one OFDM symbol in one resource block.

Common resource blocks for a subcarrier-spacing configuration u are indexed in ascending order from 0 in the frequency domain in a common resource block-set. The common resource block with index 0 for the subcarrier-spacing configuration u includes (or collides with, matches) the point 3000. The index $n^u_{CRB}$ of the common resource block with respect to the subcarrier-spacing configuration u satisfies the relationship of $n^u_{CRB}=$ceil $(k_{sc}/N^{RB}_{sc})$. The subcarrier with $k_{sc}=0$ is a subcarrier with the same center frequency as the center frequency of the subcarrier which corresponds to the point 3000.

Physical resource blocks for a subcarrier-spacing configuration u are indexed in ascending order from 0 in the frequency domain in a BWP. The index $n^u_{PRB}$ of the physical resource block with respect to the subcarrier-spacing configuration u satisfies the relationship of $n^u_{CRB}=n^u_{PRB}+N^{start,u}_{BWP,i}$. The $N^{start,u}_{BWP,i}$ indicates the reference point of BWP with index i.

A BWP is defined as a subset of common resource blocks included in the resource grid. The BWP includes $N^{size,u}_{BWP,i}$ common resource blocks starting from the reference points $N^{start,u}_{BWP,i}$. A BWP for the downlink component carrier is also referred to as a downlink BWP. A BWP for the uplink component carrier is also referred to as an uplink BWP.

An antenna port is defined such that the channel over which a symbol on the antenna port is conveyed can be inferred from the channel over which another symbol on the same antenna port is conveyed. For example, the channel may correspond to a physical channel. For example, the symbols may correspond to OFDM symbols. For example, the symbols may correspond to resource block units. For example, the symbols may correspond to resource elements.

Two antenna ports are said to be QCL (Quasi Co-Located) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

Carrier aggregation may be communication using a plurality of aggregated serving cells. Carrier aggregation may be communication using a plurality of aggregated component carriers. Carrier aggregation may be communication using a plurality of aggregated downlink component carriers. Carrier aggregation may be communication using a plurality of aggregated uplink component carriers.

Figure 5:
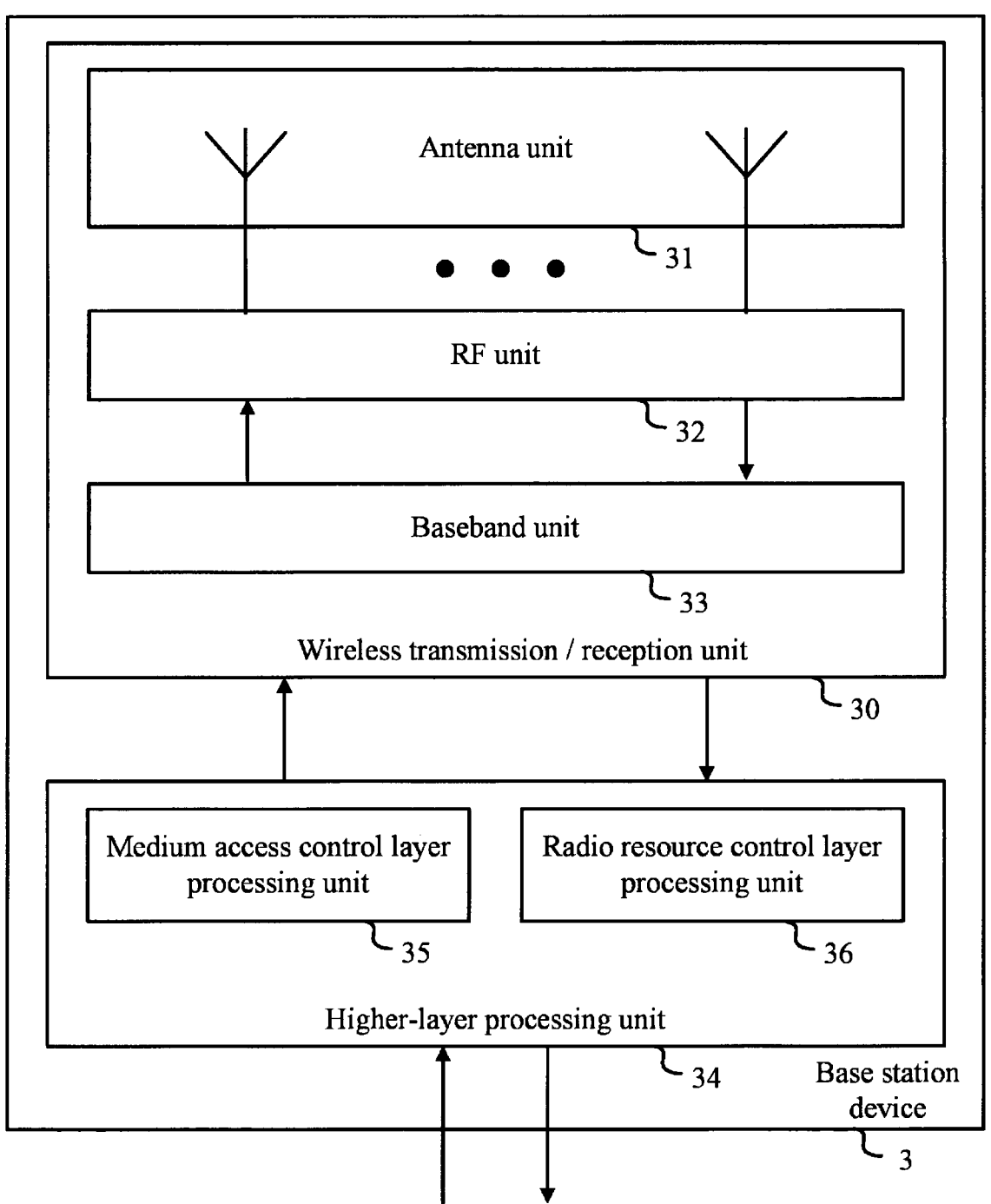
FIG. 5 is a schematic block diagram showing a configuration example of the base station device 3 according to an aspect of the present embodiment.

FIG. 5 is a schematic block diagram showing a configuration example of the base station device 3 according to an aspect of the present embodiment. As shown in FIG. 5, the base station device 3 includes at least a part or all of the wireless transmission/reception unit (physical layer processing unit) 30 and the higher-layer processing unit 34. The wireless transmission/reception unit 30 includes at least a part or all of the antenna unit 31, the RF unit 32 (Radio Frequency unit 32), and the baseband unit 33. The higher-layer processing unit 34 includes at least a part or all of the medium access control layer processing unit 35 and the radio resource control (RRC: Radio Resource Control) layer processing unit 36.

The wireless transmission/reception unit 30 includes at least a part of or all of a wireless transmission unit 30a and a wireless reception unit 30b. The configuration of the baseband unit 33 included in the wireless transmission unit 30a and the configuration of the baseband unit 33 included in the wireless reception unit 30b may be the same or different. The configuration of the RF unit 32 included in the wireless transmission unit 30a and the configuration of the RF unit 32 included in the wireless reception unit 30b may be the same or different. The configuration of the antenna unit 31 included in the wireless transmission unit 30a and the configuration of the antenna unit 31 included in the wireless reception unit 30b may be the same or different.

The higher-layer processing unit 34 provides downlink data (a transport block) to the wireless transmission/reception unit 30 (or the wireless transmission unit 30a). The higher-layer processing unit 34 performs processing of a medium access control (MAC) layer, a packet data convergence protocol layer (PDCP layer), a radio link control layer (RLC layer) and/or an RRC layer.

The medium access control layer processing unit 35 included in the higher-layer processing unit 34 performs processing of the MAC layer.

The radio resource control layer processing unit 36 included in the higher-layer processing unit 34 performs the process of the RRC layer. The radio resource control layer processing unit 36 manages various configuration information/parameters (RRC parameters) of the terminal device 1. The radio resource control layer processing unit 36 configures an RRC parameter based on the RRC message received from the terminal device 1.

The wireless transmission/reception unit 30 (or the wireless transmission unit 30a) performs processing such as encoding and modulation. The wireless transmission/reception unit 30 (or the wireless transmission unit 30a) generates a physical signal by encoding and modulating the downlink data. The wireless transmission/reception unit 30 (or the wireless transmission unit 30a) converts OFDM symbols in the physical signal to a baseband signal by conversion to a time-continuous signal. The wireless transmission/reception unit 30 (or the wireless transmission unit 30a) transmits the baseband signal (or the physical signal) to the terminal device 1 via radio frequency. The wireless transmission/reception unit 30 (or the wireless transmission unit 30a) may arrange the baseband signal (or the physical signal) on a component carrier and transmit the baseband signal (or the physical signal) to the terminal device 1.

The wireless transmission/reception unit 30 (or the wireless reception unit 30b) performs processing such as demodulation and decoding. The wireless transmission/reception unit 30 (or the wireless reception unit 30b) separates, demodulates and decodes the received physical signal, and provides the decoded information to the higher-layer processing unit 34. The wireless transmission/reception unit 30 (or the wireless reception unit 30b) may perform the channel access procedure prior to the transmission of the physical signal.

The RF unit 32 demodulates the physical signal received via the antenna unit 31 into a baseband signal (down convert), and/or removes extra frequency components. The RF unit 32 provides the processed analog signal to the baseband unit 33.

The baseband unit 33 converts an analog signal (signals on radio frequency) input from the RF unit 32 into a digital signal (a baseband signal). The baseband unit 33 separates a portion which corresponds to CP (Cyclic Prefix) from the digital signal. The baseband unit 33 performs Fast Fourier Transformation (FFT) on the digital signal from which the CP has been removed. The baseband unit 33 provides the physical signal in the frequency domain.

The baseband unit 33 performs Inverse Fast Fourier Transformation (IFFT) on downlink data to generate an OFDM symbol, adds a CP to the generated OFDM symbol, generates a digital signal (baseband signal), and convert the digital signal into an analog signal. The baseband unit 33 provides the analog signal to the RF unit 32.

The RF unit 32 removes extra frequency components from the analog signal (signals on radio frequency) input from the baseband unit 33, up-converts the analog signal to a radio frequency, and transmits it via the antenna unit 31. The RF unit 32 may have a function of controlling transmission power. The RF unit 32 is also referred to as a transmission power control unit.

At least one or more serving cells (or one or more component carriers, one or more downlink component carriers, one or more uplink component carriers) may be configured for the terminal device 1.

Each of the serving cells set for the terminal device 1 may be any of PCell (Primary cell), PSCell (Primary SCG cell), and SCell (Secondary Cell).

A PCell is a serving cell included in a MCG (Master Cell Group). A PCell is a cell (implemented cell) which performs an initial connection establishment procedure or a connection re-establishment procedure by the terminal device 1.

A PSCell is a serving cell included in a SCG (Secondary Cell Group). A PSCell is a serving cell in which random-access is performed by the terminal device 1 in a reconfiguration procedure with synchronization (Reconfiguration with synchronization).

A SCell may be included in either a MCG or a SCG.

The serving cell group (cell group) is a designation including at least MCG and SCG. The serving cell group may include one or more serving cells (or one or more component carriers). One or more serving cells (or one or more component carriers) included in the serving cell group may be operated by carrier aggregation.

One or more downlink BWPs may be configured for each serving cell (or each downlink component carrier). One or more uplink BWPs may be configured for each serving cell (or each uplink component carrier).

Among the one or more downlink BWPs set for the serving cell (or the downlink component carrier), one downlink BWP may be set as an active downlink BWP (or one downlink BWP may be activated). Among the one or more uplink BWPs set for the serving cell (or the uplink component carrier), one uplink BWP may be set as an active uplink BWP (or one uplink BWP may be activated).

A PDSCH, a PDCCH, and a CSI-RS may be received in the active downlink BWP. The terminal device 1 may receive the PDSCH, the PDCCH, and the CSI-RS in the active downlink BWP. A PUCCH and a PUSCH may be sent on the active uplink BWP. The terminal device 1 may transmit the PUCCH and the PUSCH in the active uplink BWP. The active downlink BWP and the active uplink BWP are also referred to as active BWP.

The PDSCH, the PDCCH, and the CSI-RS may not be received in downlink BWPs (inactive downlink BWPs) other than the active downlink BWP. The terminal device 1 may not receive the PDSCH, the PDCCH, and the CSI-RS in the downlink BWPs which are other than the active downlink BWP. The PUCCH and the PUSCH do not need to be transmitted in uplink BWPs (inactive uplink BWPs) other than the active uplink BWP. The terminal device 1 may not transmit the PUCCH and the PUSCH in the uplink BWPs which is other than the active uplink BWP. The inactive downlink BWP and the inactive uplink BWP are also referred to as inactive BWP.

Downlink BWP switching deactivates an active downlink BWP and activates one of inactive downlink BWPs which are other than the active downlink BWP. The downlink BWP switching may be controlled by a BWP field included in a downlink control information. The downlink BWP switching may be controlled based on higher-layer parameters.

Uplink BWP switching is used to deactivate an active uplink BWP and activate any inactive uplink BWP which is other than the active uplink BWP. Uplink BWP switching may be controlled by a BWP field included in a downlink control information. The uplink BWP switching may be controlled based on higher-layer parameters.

Among the one or more downlink BWPs set for the serving cell, two or more downlink BWPs may not be set as active downlink BWPs. For the serving cell, one downlink BWP may be active at a certain time.

Among the one or more uplink BWPs set for the serving cell, two or more uplink BWPs may not be set as active uplink BWPs. For the serving cell, one uplink BWP may be active at a certain time.

Figure 6:
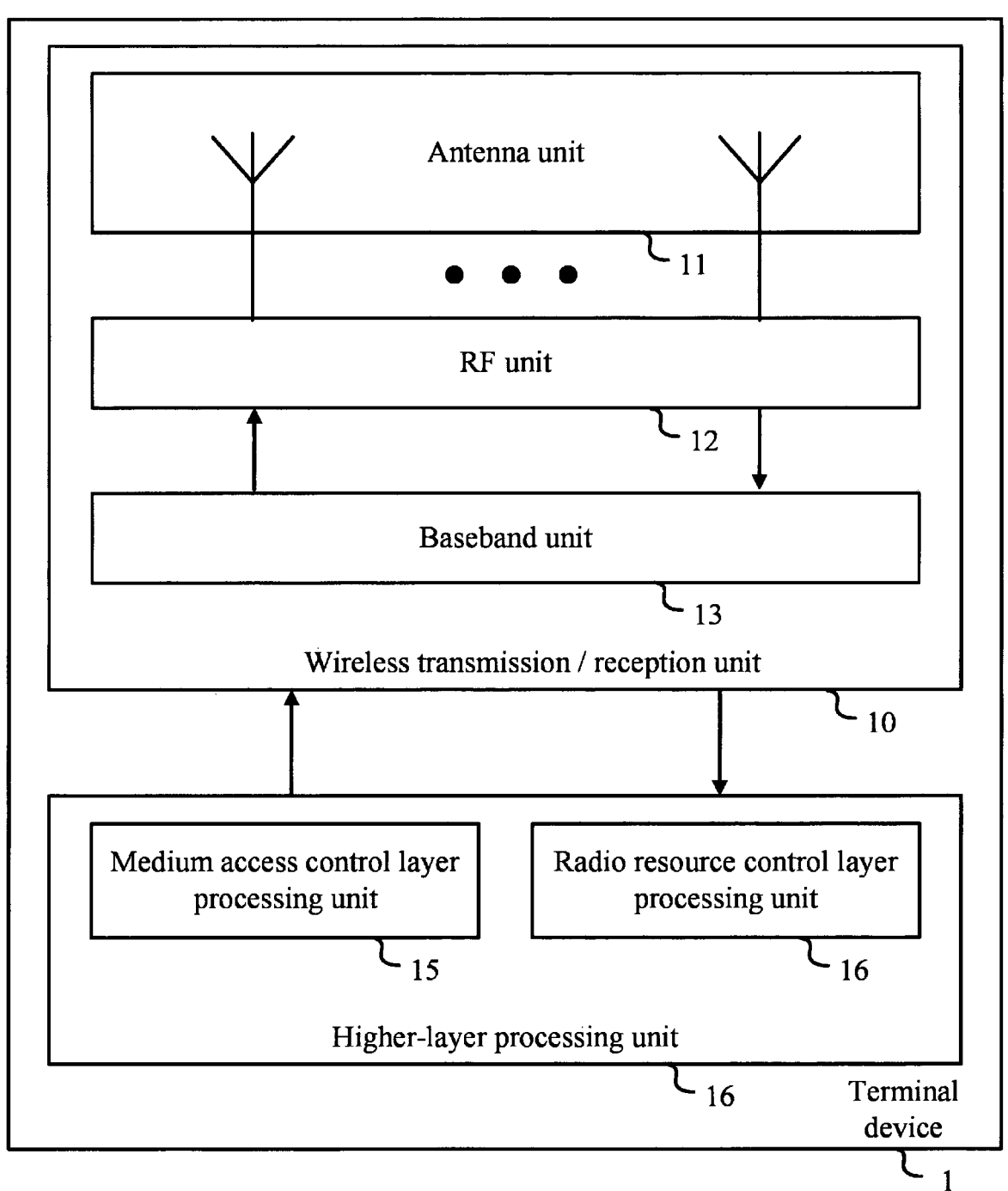
FIG. 6 is a schematic block diagram showing a configuration example of the terminal device 1 according to an aspect of the present embodiment.

FIG. 6 is a schematic block diagram showing a configuration example of the terminal device 1 according to an aspect of the present embodiment. As shown in FIG. 6, the terminal device 1 includes at least a part or all of the wireless transmission/reception unit (physical layer processing unit) 10 and the higher-layer processing unit 14. The wireless transmission/reception unit 10 includes at least a part or all of the antenna unit 11, the RF unit 12, and the baseband unit 13. The higher-layer processing unit 14 includes at least a part or all of the medium access control layer processing unit 15 and the radio resource control layer processing unit 16.

The wireless transmission/reception unit 10 includes at least a part of or all of a wireless transmission unit 10a and a wireless reception unit 10b. The configuration of the baseband unit 13 included in the wireless transmission unit 10a and the configuration of the baseband unit 13 included in the wireless reception unit 10b may be the same or different. The configuration of the RF unit 12 included in the wireless transmission unit 10a and the RF unit 12 included in the wireless reception unit 10b may be the same or different. The configuration of the antenna unit 11 included in the wireless transmission unit 10a and the configuration of the antenna unit 11 included in the wireless reception unit 10b may be the same or different.

The higher-layer processing unit 14 provides uplink data (a transport block) to the wireless transmission/reception unit 10 (or the wireless transmission unit 10a). The higher-layer processing unit 14 performs processing of a MAC layer, a packet data integration protocol layer, a radio link control layer, and/or an RRC layer.

The medium access control layer processing unit 15 included in the higher-layer processing unit 14 performs processing of the MAC layer.

The radio resource control layer processing unit 16 included in the higher-layer processing unit 14 performs the process of the RRC layer. The radio resource control layer processing unit 16 manages various configuration information/parameters (RRC parameters) of the terminal device 1. The radio resource control layer processing unit 16 configures RRC parameters based on the RRC message received from the base station device 3.

The wireless transmission/reception unit 10 (or the wireless transmission unit 10*a*) performs processing such as encoding and modulation. The wireless transmission/reception unit 10 (or the wireless transmission unit 10*a*) generates a physical signal by encoding and modulating the uplink data. The wireless transmission/reception unit 10 (or the wireless transmission unit 10*a*) converts OFDM symbols in the physical signal to a baseband signal by conversion to a time-continuous signal. The wireless transmission/reception unit 10 (or the wireless transmission unit 10*a*) transmits the baseband signal (or the physical signal) to the base station device 3 via radio frequency. The wireless transmission/reception unit 10 (or the wireless transmission unit 10*a*) may arrange the baseband signal (or the physical signal) on a BWP (active uplink BWP) and transmit the baseband signal (or the physical signal) to the base station device 3.

The wireless transmission/reception unit 10 (or the wireless reception unit 10*b*) performs processing such as demodulation and decoding. The wireless transmission/reception unit 10 (or the wireless reception unit 10*b*) may receive a physical signal in a BWP (active downlink BWP) of a serving cell. The wireless transmission/reception unit 10 (or the wireless reception unit 10*b*) separates, demodulates and decodes the received physical signal, and provides the decoded information to the higher-layer processing unit 14. The wireless transmission/reception unit 10 (or the wireless reception unit 10*b*) may perform the channel access procedure prior to the transmission of the physical signal.

The RF unit 12 demodulates the physical signal received via the antenna unit 11 into a baseband signal (down convert), and/or removes extra frequency components. The RF unit 12 provides the processed analog signal to the baseband unit 13.

The baseband unit 13 converts an analog signal (signals on radio frequency) input from the RF unit 12 into a digital signal (a baseband signal). The baseband unit 13 separates a portion which corresponds to CP from the digital signal, performs fast Fourier transformation on the digital signal from which the CP has been removed, and provides the physical signal in the frequency domain.

The baseband unit 13 performs inverse fast Fourier transformation on uplink data to generate an OFDM symbol, adds a CP to the generated OFDM symbol, generates a digital signal (baseband signal), and convert the digital signal into an analog signal. The baseband unit 13 provides the analog signal to the RF unit 12.

The RF unit 12 removes extra frequency components from the analog signal (signals on radio frequency) input from the baseband unit 13, up-converts the analog signal to a radio frequency, and transmits it via the antenna unit 11 The RF unit 12 may have a function of controlling transmission power. The RF unit 12 is also referred to as a transmission power control unit.

Hereinafter, physical signals (signals) will be described.

Physical signal is a generic term for downlink physical channels, downlink physical signals, uplink physical channels, and uplink physical channels. The physical channel is a generic term for downlink physical channels and uplink physical channels.

An uplink physical channel may correspond to a set of resource elements that carry information originating from the higher-layer and/or uplink control information. The uplink physical channel may be a physical channel used in an uplink component carrier. The uplink physical channel may be transmitted by the terminal device 1. The uplink physical channel may be received by the base station device 3. In the wireless communication system according to one aspect of the present embodiment, at least part or all of PUCCH (Physical Uplink Control CHannel), PUSCH (Physical Uplink Shared CHannel), and PRACH (Physical Random Access CHannel) may be used.

A PUCCH may be used to transmit uplink control information (UCI: Uplink Control Information). The PUCCH may be sent to deliver (transmission, convey) uplink control information. The uplink control information may be mapped to (or arranged in) the PUCCH. The terminal device 1 may transmit PUCCH in which uplink control information is arranged. The base station device 3 may receive the PUCCH in which the uplink control information is arranged.

Uplink control information (uplink control information bit, uplink control information sequence, uplink control information type) includes at least part or all of channel state information (CSI: Channel State Information), scheduling request (SR: Scheduling Request), and HARQ-ACK (Hybrid Automatic Repeat request ACKnowledgement).

Channel state information is conveyed by using channel state information bits or a channel state information sequence. Scheduling request is also referred to as a scheduling request bit or a scheduling request sequence. HARQ-ACK information is also referred to as a HARQ-ACK information bit or a HARQ-ACK information sequence.

HARQ-ACK information may include HARQ-ACK status which corresponds to a transport block (TB: Transport block, MAC PDU: Medium Access Control Protocol Data Unit, DL-SCH: Downlink-Shared Channel, UL-SCH: Uplink-Shared Channel, PDSCH: Physical Downlink Shared CHannel, PUSCH: Physical Uplink Shared CHannel). The HARQ-ACK status may indicate ACK (acknowledgement) or NACK (negative-acknowledgement) corresponding to the transport block. The ACK may indicate that the transport block has been successfully decoded. The NACK may indicate that the transport block has not been successfully decoded. The HARQ-ACK information may include a HARQ-ACK codebook that includes one or more HARQ-ACK status (or HARQ-ACK bits).

For example, the correspondence between the HARQ-ACK information and the transport block may mean that the HARQ-ACK information and the PDSCH used for transmission of the transport block correspond.

HARQ-ACK status may indicate ACK or NACK which correspond to one CBG (Code Block Group) included in the transport block.

The scheduling request may at least be used to request PUSCH (or UL-SCH) resources for new transmission. The scheduling request may be used to indicate either a positive SR or a negative SR. The fact that the scheduling request indicates a positive SR is also referred to as "a positive SR is sent". The positive SR may indicate that the PUSCH (or UL-SCH) resource for initial transmission is requested by the terminal device 1. A positive SR may indicate that a higher-layer is to trigger a scheduling request. The positive SR may be sent when the higher-layer instructs to send a scheduling request. The fact that the scheduling request bit indicates a negative SR is also referred to as "a negative SR is sent". A negative SR may indicate that the PUSCH (or UL-SCH) resource for initial transmission is not requested by the terminal device 1. A negative SR may indicate that the higher-layer does not trigger a scheduling request. A negative SR may be sent if the higher-layer is not instructed to send a scheduling request.

The channel state information may include at least part or all of a channel quality indicator (CQI), a precoder matrix indicator (PMI), and a rank indicator (RI). CQI is an indicator related to channel quality (e.g., propagation quality) or physical channel quality, and PMI is an indicator related to a precoder. RI is an indicator related to transmission rank (or the number of transmission layers).

Channel state information may be provided at least based on receiving one or more physical signals (e.g., one or more CSI-RSs) used at least for channel measurement. The channel state information may be selected by the terminal device 1 at least based on receiving one or more physical signals used for channel measurement. Channel measurements may include interference measurements.

A PUCCH may correspond to a PUCCH format. A PUCCH may be a set of resource elements used to convey a PUCCH format. A PUCCH may include a PUCCH format. A PUCCH format may include UCI.

A PUSCH may be used to transmit uplink data (a transport block) and/or uplink control information. A PUSCH may be used to transmit uplink data (a transport block) corresponding to a UL-SCH and/or uplink control information. A PUSCH may be used to convey uplink data (a transport block) and/or uplink control information. A PUSCH may be used to convey uplink data (a transport block) corresponding to a UL-SCH and/or uplink control information. Uplink data (a transport block) may be arranged in a PUSCH. Uplink data (a transport block) corresponding to UL-SCH may be arranged in a PUSCH. Uplink control information may be arranged to a PUSCH. The terminal device 1 may transmit a PUSCH in which uplink data (a transport block) and/or uplink control information is arranged. The base station device 3 may receive a PUSCH in which uplink data (a transport block) and/or uplink control information is arranged.

A PRACH may be used to transmit a random-access preamble. The PRACH may be used to convey a random-access preamble. The sequence $x_{u,v}(n)$ of the PRACH is defined by $x_{u,v}(n)=x_u(\mathrm{mod}\,(n+C_v, L_{RA}))$. The $x_u$ may be a ZC sequence (Zadoff-Chu sequence). The $x_u$ may be defined by $x_u=\exp(-j p u i(i+1)/L_{RA})$. The j is an imaginary unit. The p is the circle ratio. The $C_v$ corresponds to cyclic shift of the PRACH. $L_{RA}$ corresponds to the length of the PRACH. The $L_{RA}$ may be 839 or 139 or another value. The i is an integer in the range of 0 to $L_{RA}-1$. The u is a sequence index for the PRACH. The terminal device 1 may transmit the PRACH. The base station device 3 may receive the PRACH.

For a given PRACH opportunity, 64 random-access preambles are defined. The random-access preamble is specified (determined, given) at least based on the cyclic shift Cv of the PRACH and the sequence index u for the PRACH.

An uplink physical signal may correspond to a set of resource elements. The uplink physical signal may not carry information generated in the higher-layer. The uplink physical signal may be a physical signal used in the uplink component carrier. The terminal device 1 may transmit an uplink physical signal. The base station device 3 may receive the uplink physical signal. In the radio communication system according to one aspect of the present embodiment, at least a part or all of UL DMRS (UpLink Demodulation Reference Signal), SRS (Sounding Reference Signal), UL PTRS (UpLink Phase Tracking Reference Signal) may be used.

UL DMRS is a generic name of a DMRS for a PUSCH and a DMRS for a PUCCH.

A set of antenna ports of a DMRS for a PUSCH (a DMRS associated with a PUSCH, a DMRS included in a PUSCH, a DMRS which corresponds to a PUSCH) may be given based on a set of antenna ports for the PUSCH. That is, the set of DMRS antenna ports for the PUSCH may be the same as the set of antenna ports for the PUSCH.

Transmission of a PUSCH and transmission of a DMRS for the PUSCH may be indicated (or scheduled) by one DCI format. The PUSCH and the DMRS for the PUSCH may be collectively referred to as a PUSCH. Transmission of the PUSCH may be transmission of the PUSCH and the DMRS for the PUSCH.

A PUSCH may be estimated from a DMRS for the PUSCH. That is, propagation path of the PUSCH may be estimated from the DMRS for the PUSCH.

A set of antenna ports of a DMRS for a PUCCH (a DMRS associated with a PUCCH, a DMRS included in a PUCCH, a DMRS which corresponds to a PUCCH) may be identical to a set of antenna ports for the PUCCH.

Transmission of a PUCCH and transmission of a DMRS for the PUCCH may be indicated (or triggered) by one DCI format. The arrangement of the PUCCH in resource elements (resource element mapping) and/or the arrangement of the DMRS in resource elements for the PUCCH may be provided at least by one PUCCH format. The PUCCH and the DMRS for the PUCCH may be collectively referred to as PUCCH. Transmission of the PUCCH may be transmission of the PUCCH and the DMRS for the PUCCH.

A PUCCH may be estimated from a DMRS for the PUCCH. That is, propagation path of the PUCCH may be estimated from the DMRS for the PUCCH.

A downlink physical channel may correspond to a set of resource elements that carry information originating from the higher-layer and/or downlink control information. The downlink physical channel may be a physical channel used in the downlink component carrier. The base station device 3 may transmit the downlink physical channel. The terminal device 1 may receive the downlink physical channel. In the wireless communication system according to one aspect of the present embodiment, at least a part or all of PBCH (Physical Broadcast Channel), PDCCH (Physical Downlink Control Channel), and PDSCH (Physical Downlink Shared Channel) may be used.

The PBCH may be used to transmit a MIB (Master Information Block) and/or physical layer control information. The physical layer control information is a kind of downlink control information. The PBCH may be sent to deliver the MIB and/or the physical layer control information. A BCH may be mapped (or corresponding) to the PBCH. The terminal device 1 may receive the PBCH. The base station device 3 may transmit the PBCH. The physical layer control information is also referred to as a PBCH payload and a PBCH payload related to timing. The MIB may include one or more higher-layer parameters.

Physical layer control information includes 8 bits. The physical layer control information may include at least part or all of 0A to 0D. The 0A is radio frame information. The 0B is half radio frame information (half system frame information). The 0C is SS/PBCH block index information. The 0D is subcarrier offset information.

The radio frame information is used to indicate a radio frame in which the PBCH is transmitted (a radio frame including a slot in which the PBCH is transmitted). The radio frame information is represented by 4 bits. The radio frame information may be represented by 4 bits of a radio frame indicator. The radio frame indicator may include 10 bits. For example, the radio frame indicator may at least be used to identify a radio frame from index 0 to index 1023.

The half radio frame information is used to indicate whether the PBCH is transmitted in first five subframes or in second five subframes among radio frames in which the PBCH is transmitted. Here, the half radio frame may be configured to include five subframes. The half radio frame may be configured by five subframes of the first half of ten subframes included in the radio frame. The half radio frame may be configured by five subframes in the second half of ten subframes included in the radio frame.

The SS/PBCH block index information is used to indicate an SS/PBCH block index. The SS/PBCH block index information may be represented by 3 bits. The SS/PBCH block index information may consist of 3 bits of an SS/PBCH block index indicator. The SS/PBCH block index indicator may include 6 bits. The SS/PBCH block index indicator may at least be used to identify an SS/PBCH block from index 0 to index 63 (or from index 0 to index 3, from index 0 to index 7, from index 0 to index 9, from index 0 to index 19, etc.).

The subcarrier offset information is used to indicate subcarrier offset. The subcarrier offset information may be used to indicate the difference between the first subcarrier in which the PBCH is arranged and the first subcarrier in which the control resource set with index 0 is arranged.

A PDCCH may be used to transmit downlink control information (DCI). A PDCCH may be transmitted to deliver downlink control information. Downlink control information may be mapped to a PDCCH. The terminal device 1 may receive a PDCCH in which downlink control information is arranged. The base station device 3 may transmit the PDCCH in which the downlink control information is arranged.

Downlink control information may correspond to a DCI format. Downlink control information may be included in a DCI format. Downlink control information may be arranged in each field of a DCI format.

DCI format is a generic name for DCI format 0_0, DCI format 0_1, DCI format 1_0, and DCI format 1_1. Uplink DCI format is a generic name of the DCI format 0_0 and the DCI format 0_1. Downlink DCI format is a generic name of the DCI format 1_0 and the DCI format 1_1.

The DCI format 0_0 is at least used for scheduling a PUSCH for a cell (or a PUSCH arranged on a cell). The DCI format 0_0 includes at least a part or all of fields 1A to 1E. The 1A is a DCI format identification field (Identifier field for DCI formats). The 1B is a frequency domain resource assignment field (FDRA field). The 1C is a time domain resource assignment field (TDRA field). The 1D is a frequency-hopping flag field. The 1E is an MCS field (Modulation-and-Coding-Scheme field).

The DCI format identification field may indicate whether the DCI format including the DCI format identification field is an uplink DCI format or a downlink DCI format. The DCI format identification field included in the DCI format 0_0 may indicate 0 (or may indicate that the DCI format 0_0 is an uplink DCI format).

The frequency domain resource assignment field included in the DCI format 0_0 may be at least used to indicate the assignment (allocation) of frequency resources for a PUSCH. The frequency domain resource assignment field included in the DCI format 0_0 may be at least used to indicate the assignment (allocation) of frequency resources for a PUSCH scheduled by the DCI format 0_0.

The time domain resource assignment field included in the DCI format 0_0 may be at least used to indicate the assignment of time resources for a PUSCH. The time domain resource assignment field included in the DCI format 0_0 may be at least used to indicate the assignment of time resources for a PUSCH scheduled by the DCI format 0_0.

The frequency-hopping flag field may be at least used to indicate whether frequency-hopping is applied to a PUSCH. The frequency-hopping flag field may be at least used to indicate whether frequency-hopping is applied to a PUSCH scheduled by the DCI format 0_0.

The MCS field included in the DCI format 0_0 may be at least used to indicate a modulation scheme for a PUSCH and/or a part or all of a target coding rate for the PUSCH. The MCS field included in the DCI format 0_0 may be at least used to indicate a modulation scheme for a PUSCH scheduled by the DCI format 0_0 and/or a part or all of a target coding rate for the PUSCH. A size of a transport block (TBS: Transport Block Size) of a PUSCH may be given based at least on a target coding rate and a part or all of a modulation scheme for the PUSCH.

The DCI format 0_0 may not include fields used for a CSI request. That is, CSI may not be requested by the DCI format 0_0.

The DCI format 0_0 may not include a carrier indicator field. An uplink component carrier on which a PUSCH scheduled by the DCI format 0_0 is arranged may be the same as an uplink component carrier on which a PDCCH including the DCI format 0_0 is arranged.

The DCI format 0_0 may not include a BWP field. An uplink BWP on which a PUSCH scheduled by the DCI format 0_0 is arranged may be the same as an uplink BWP on which a PDCCH including the DCI format 0_0 is arranged.

The DCI format 0_1 is at least used for scheduling of a PUSCH for a cell (or arranged on a cell). The DCI format 0_1 includes at least a part or all of fields 2A to 2H. The 2A is a DCI format identification field. The 2B is a frequency domain resource assignment field. The 2C is a time domain resource assignment field. The 2D is a frequency-hopping flag field. The 2E is an MCS field. The 2F is a CSI request field. The 2G is a BWP field. The 2H is a carrier indicator field.

The DCI format identification field included in the DCI format 0_1 may indicate 0 (or may indicate that the DCI format 0_1 is an uplink DCI format).

The frequency domain resource assignment field included in the DCI format 0_1 may be at least used to indicate the assignment of frequency resources for a PUSCH. The frequency domain resource assignment field included in the DCI format 0_1 may be at least used to indicate the assignment of frequency resources for a PUSCH scheduled by the DCI format.

The time domain resource assignment field included in the DCI format 0_1 may be at least used to indicate the assignment of time resources for a PUSCH. The time domain resource assignment field included in DCI format 0_1 may be at least used to indicate the assignment of time resources for a PUSCH scheduled by the DCI format 0_1.

The frequency-hopping flag field may be at least used to indicate whether frequency-hopping is applied to a PUSCH scheduled by the DCI format 0_1.

The MCS field included in the DCI format 0_1 may be at least used to indicate a modulation scheme for a PUSCH and/or a part or all of a target coding rate for the PUSCH. The MCS field included in the DCI format 0_1 may be at least used to indicate a modulation scheme for a PUSCH scheduled by the DCI format and/or part or all of a target coding rate for the PUSCH.

When the DCI format 0_1 includes the BWP field, the BWP field may be used to indicate an uplink BWP on which a PUSCH scheduled by the DCI format 0_1 is arranged. When the DCI format 0_1 does not include the BWP field, an uplink BWP on which a PUSCH is arranged may be the active uplink BWP. When the number of uplink BWPs configured in the terminal device 1 in a uplink component carrier is two or more, the number of bits for the BWP field included in the DCI format 0_1 used for scheduling a PUSCH arranged on the uplink component carrier may be one or more. When the number of uplink BWPs configured in the terminal device 1 in a uplink component carrier is one, the number of bits for the BWP field included in the DCI format 0_1 used for scheduling a PUSCH arranged on the uplink component carrier may be zero.

The CSI request field is at least used to indicate CSI reporting.

If the DCI format 0_1 includes the carrier indicator field, the carrier indicator field may be used to indicate an uplink component carrier (or a serving cell) on which a PUSCH is arranged. When the DCI format 0_1 does not include the carrier indicator field, a serving cell on which a PUSCH is arranged may be the same as the serving cell on which a PDCCH including the DCI format 0_1 used for scheduling of the PUSCH is arranged. When the number of uplink component carriers (or the number of serving cells) configured in the terminal device 1 in a serving cell group is two or more (when uplink carrier aggregation is operated in a serving cell group), or when cross-carrier scheduling is configured for the serving cell group, the number of bits for the carrier indicator field included in the DCI format 0_1 used for scheduling a PUSCH arranged on the serving cell group may be one or more (e.g., 3). When the number of uplink component carriers (or the number of serving cells) configured in the terminal device 1 in a serving cell group is one (or when uplink carrier aggregation is not operated in a serving cell group), or when the cross-carrier scheduling is not configured for the serving cell group, the number of bits for the carrier indicator field included in the DCI format 0_1 used for scheduling of a PUSCH arranged on the serving cell group may be zero.

The DCI format 1_0 is at least used for scheduling of a PDSCH for a cell (arranged on a cell). The DCI format 1_0 includes at least a part or all of fields 3A to 3F. The 3A is a DCI format identification field. The 3B is a frequency domain resource assignment field. The 3C is a time domain resource assignment field. The 3D is an MCS field. The 3E is a PDSCH-to-HARQ-feedback indicator field. The 3F is a PUCCH resource indicator field.

The DCI format identification field included in the DCI format 1_0 may indicate 1 (or may indicate that the DCI format 1_0 is a downlink DCI format).

The frequency domain resource assignment field included in the DCI format 1_0 may be at least used to indicate the assignment of frequency resources for a PDSCH. The frequency domain resource assignment field included in the DCI format 1_0 may be at least used to indicate the assignment of frequency resources for a PDSCH scheduled by the DCI format 1_0.

The time domain resource assignment field included in the DCI format 1_0 may be at least used to indicate the assignment of time resources for a PDSCH. The time domain resource assignment field included in the DCI format 1_0 may be at least used to indicate the assignment of time resources for a PDSCH scheduled by the DCI format 1_0.

The MCS field included in the DCI format 1_0 may be at least used to indicate a modulation scheme for a PDSCH and/or a part or all of a target coding rate for the PDSCH. The MCS field included in the DCI format 1_0 may be at least used to indicate a modulation scheme for a PDSCH scheduled by the DCI format 1_0 and/or a part or all of a target coding rate for the PDSCH. A size of a transport block (TBS: Transport Block Size) of a PDSCH may be given based at least on a target coding rate and a part or all of a modulation scheme for the PDSCH.

The PDSCH-to-HARQ-feedback timing indicator field may be at least used to indicate the offset (K1) from a slot in which the last OFDM symbol of a PDSCH scheduled by the DCI format 1_0 is included to another slot in which the first OFDM symbol of a PUCCH triggered by the DCI format 1_0 is included.

The PUCCH resource indicator field may be a field indicating an index of any one or more PUCCH resources included in the PUCCH resource set for a PUCCH transmission. The PUCCH resource set may include one or more PUCCH resources. The PUCCH resource indicator field may trigger PUCCH transmission with a PUCCH resource indicated at least based on the PUCCH resource indicator field.

The DCI format 1_0 may not include the carrier indicator field. A downlink component carrier on which a PDSCH scheduled by the DCI format 1_0 is arranged may be the same as a downlink component carrier on which a PDCCH including the DCI format 1_0 is arranged.

The DCI format 1_0 may not include the BWP field. A downlink BWP on which a PDSCH scheduled by a DCI format 1_0 is arranged may be the same as a downlink BWP on which a PDCCH including the DCI format 1_0 is arranged.

The DCI format 1_1 is at least used for scheduling of a PDSCH for a cell (or arranged on a cell). The DCI format 1_1 includes at least a part or all of fields 4A to 4H. The 4A is a DCI format identification field. The 4B is a frequency domain resource assignment field. The 4C is a time domain resource assignment field. The 4D is an MCS field. The 4E is a PDSCH-to-HARQ-feedback indicator field. The 4F is a PUCCH resource indicator field. The 4G is a BWP field. The 4H is a carrier indicator field.

The DCI format identification field included in the DCI format 1_1 may indicate 1 (or may indicate that the DCI format 1_1 is a downlink DCI format).

The frequency domain resource assignment field included in the DCI format 1_1 may be at least used to indicate the assignment of frequency resources for a PDSCH. The frequency domain resource assignment field included in the DCI format 1_0 may be at least used to indicate the assignment of frequency resources for a PDSCH scheduled by the DCI format 1_1.

The time domain resource assignment field included in the DCI format 1_1 may be at least used to indicate the assignment of time resources for a PDSCH. The time domain resource assignment field included in the DCI format 1_1 may be at least used to indicate the assignment of time resources for a PDSCH scheduled by the DCI format 1_1.

The MCS field included in the DCI format 1_1 may be at least used to indicate a modulation scheme for a PDSCH and/or a part or all of a target coding rate for the PDSCH. The MCS field included in the DCI format 1_1 may be at least used to indicate a modulation scheme for a PDSCH scheduled by the DCI format 1_1 and/or a part or all of a target coding rate for the PDSCH.

When the DCI format 1_1 includes a PDSCH-to-HARQ-feedback timing indicator field, the PDSCH-to-HARQ-feedback timing indicator field indicates an offset (K1) from a slot including the last OFDM symbol of a PDSCH scheduled by the DCI format 1_1 to another slot including the first OFDM symbol of a PUCCH triggered by the DCI format 1_1. When the DCI format 1_1 does not include the PDSCH-to-HARQ-feedback timing indicator field, an offset from a slot in which the last OFDM symbol of a PDSCH scheduled by the DCI format 1_1 is included to another slot in which the first OFDM symbol of a PUCCH triggered by the DCI format 1_1 is identified by a higher-layer parameter.

When the DCI format 1_1 includes the BWP field, the BWP field may be used to indicate a downlink BWP on which a PDSCH scheduled by the DCI format 1_1 is arranged. When the DCI format 1_1 does not include the BWP field, a downlink BWP on which a PDSCH is arranged may be the active downlink BWP. When the number of downlink BWPs configured in the terminal device 1 in a downlink component carrier is two or more, the number of bits for the BWP field included in the DCI format 1_1 used for scheduling a PDSCH arranged on the downlink component carrier may be one or more. When the number of downlink BWPs configured in the terminal device 1 in a downlink component carrier is one, the number of bits for the BWP field included in the DCI format 1_1 used for scheduling a PDSCH arranged on the downlink component carrier may be zero.

If the DCI format 1_1 includes the carrier indicator field, the carrier indicator field may be used to indicate a downlink component carrier (or a serving cell) on which a PDSCH is arranged. When the DCI format 1_1 does not include the carrier indicator field, a downlink component carrier (or a serving cell) on which a PDSCH is arranged may be the same as a downlink component carrier (or a serving cell) on which a PDCCH including the DCI format 1_1 used for scheduling of the PDSCH is arranged. When the number of downlink component carriers (or the number of serving cells) configured in the terminal device 1 in a serving cell group is two or more (when downlink carrier aggregation is operated in a serving cell group), or when cross-carrier scheduling is configured for the serving cell group, the number of bits for the carrier indicator field included in the DCI format 1_1 used for scheduling a PDSCH arranged on the serving cell group may be one or more (e.g., 3). When the number of downlink component carriers (or the number of serving cells) configured in the terminal device 1 in a serving cell group is one (or when downlink carrier aggregation is not operated in a serving cell group), or when the cross-carrier scheduling is not configured for the serving cell group, the number of bits for the carrier indicator field included in the DCI format 1_1 used for scheduling of a PDSCH arranged on the serving cell group may be zero.

A PDSCH may be used to transmit one or more transport blocks. A PDSCH may be used to transmit one or more transport blocks which corresponds to a DL-SCH. A PDSCH may be used to convey one or more transport blocks. A PDSCH may be used to convey one or more transport blocks which corresponds to a DL-SCH. One or more transport blocks may be arranged in a PDSCH. One or more transport blocks which corresponds to a DL-SCH may be arranged in a PDSCH. The base station device 3 may transmit a PDSCH. The terminal device 1 may receive the PDSCH.

Downlink physical signals may correspond to a set of resource elements. The downlink physical signals may not carry the information generated in the higher-layer. The downlink physical signals may be physical signals used in the downlink component carrier. A downlink physical signal may be transmitted by the base station device 3. The downlink physical signal may be transmitted by the terminal device 1. In the wireless communication system according to one aspect of the present embodiment, at least a part or all of an SS (Synchronization signal), DL DMRS (DownLink DeModulation Reference Signal), CSI-RS (Channel State Information-Reference Signal), and DL PTRS (DownLink Phase Tracking Reference Signal) may be used.

The synchronization signal may be used at least for the terminal device 1 to synchronize in the frequency domain and/or time domain for downlink. The synchronization signal is a generic name of PSS (Primary Synchronization Signal) and SSS (Secondary Synchronization Signal).

Figure 7:
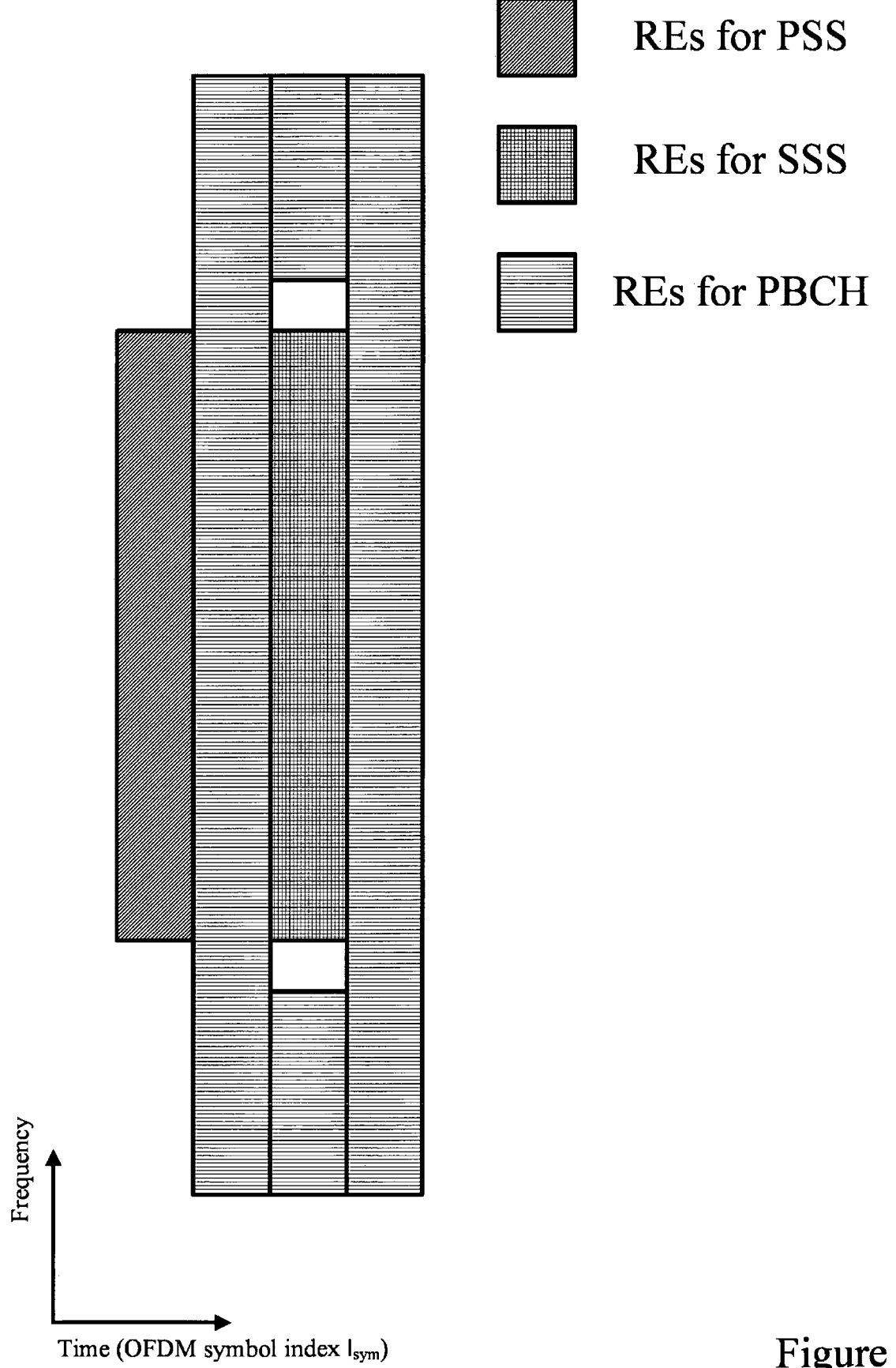
FIG. 7 is a diagram showing a configuration example of an SS/PBCH block according to an aspect of the present embodiment.

FIG. 7 is a diagram showing a configuration example of an SS/PBCH block according to an aspect of the present embodiment. In FIG. 7, the horizontal axis indicates time domain (OFDM symbol index $1_{sym}$), and the vertical axis indicates frequency domain. The shaded blocks indicate a set of resource elements for a PSS. The blocks of grid lines indicate a set of resource elements for an SSS. Also, the blocks in the horizontal line indicate a set of resource elements for a PBCH and a set of resource elements for a DMRS for the PBCH (DMRS related to the PBCH, DMRS included in the PBCH, DMRS which corresponds to the PBCH).

As shown in FIG. 7, the SS/PBCH block includes a PSS, an SSS, and a PBCH. The SS/PBCH block includes 4 consecutive OFDM symbols. The SS/PBCH block includes 240 subcarriers. The PSS is allocated to the 57th to 183rd subcarriers in the first OFDM symbol. The SSS is allocated to the 57th to 183rd subcarriers in the third OFDM symbol. The first to 56th subcarriers of the first OFDM symbol may be set to zero. The 184th to 240th subcarriers of the first OFDM symbol may be set to zero. The 49th to 56th subcarriers of the third OFDM symbol may be set to zero. The 184th to 192nd subcarriers of the third OFDM symbol may be set to zero. In the first to 240th subcarriers of the second OFDM symbol, the PBCH is allocated to subcarriers in which the DMRS for the PBCH is not allocated. In the first to 48th subcarriers of the third OFDM symbol, the PBCH is allocated to subcarriers in which the DMRS for the PBCH is not allocated. In the 193rd to 240th subcarriers of the third OFDM symbol, the PBCH is allocated to subcarriers in which the DMRS for the PBCH is not allocated. In the first to 240th subcarriers of the 4th OFDM symbol, the PBCH is allocated to subcarriers in which the DMRS for the PBCH is not allocated.

The antenna ports of a PSS, an SSS, a PBCH, and a DMRS for the PBCH in an SS/PBCH block may be identical.

A PBCH may be estimated from a DMRS for the PBCH. For the DM-RS for the PBCH, the channel over which a symbol for the PBCH on an antenna port is conveyed can be inferred from the channel over which another symbol for the DM-RS on the antenna port is conveyed only if the two symbols are within a SS/PBCH block transmitted within the same slot, and with the same SS/PBCH block index.

DL DMRS is a generic name of DMRS for a PBCH, DMRS for a PDSCH, and DMRS for a PDCCH.

A set of antenna ports for a DMRS for a PDSCH (a DMRS associated with a PDSCH, a DMRS included in a PDSCH, a DMRS which corresponds to a PDSCH) may be given based on the set of antenna ports for the PDSCH. The set of antenna ports for the DMRS for the PDSCH may be the same as the set of antenna ports for the PDSCH.

Transmission of a PDSCH and transmission of a DMRS for the PDSCH may be indicated (or scheduled) by one DCI format. The PDSCH and the DMRS for the PDSCH may be collectively referred to as PDSCH. Transmitting a PDSCH may be transmitting a PDSCH and a DMRS for the PDSCH.

A PDSCH may be estimated from a DMRS for the PDSCH. For a DM-RS associated with a PDSCH, the channel over which a symbol for the PDSCH on one antenna port is conveyed can be inferred from the channel over which another symbol for the DM-RS on the antenna port is conveyed only if the two symbols are within the same resource as the scheduled PDSCH, in the same slot, and in the same PRG (Precoding Resource Group).

Antenna ports for a DMRS for a PDCCH (a DMRS associated with a PDCCH, a DMRS included in a PDCCH, a DMRS which corresponds to a PDCCH) may be the same as an antenna port for the PDCCH.

A PDCCH may be estimated from a DMRS for the PDCCH. For a DM-RS associated with a PDCCH, the channel over which a symbol for the PDCCH on one antenna port is conveyed can be inferred from the channel over which another symbol for the DM-RS on the same antenna port is conveyed only if the two symbols are within resources for which the UE may assume the same precoding being used (i.e. within resources in a REG bundle).

A BCH (Broadcast CHannel), a UL-SCH (Uplink-Shared CHannel) and a DL-SCH (Downlink-Shared CHannel) are transport channels. A channel used in the MAC layer is called a transport channel. A unit of transport channel used in the MAC layer is also called transport block (TB) or MAC PDU (Protocol Data Unit). In the MAC layer, control of HARQ (Hybrid Automatic Repeat request) is performed for each transport block. The transport block is a unit of data delivered by the MAC layer to the physical layer. In the physical layer, transport blocks are mapped to codewords and modulation processing is performed for each codeword.

One UL-SCH and one DL-SCH may be provided for each serving cell. BCH may be given to PCell. BCH may not be given to PSCell and SCell.

A BCCH (Broadcast Control CHannel), a CCCH (Common Control CHannel), and a DCCH (Dedicated Control CHannel) are logical channels. The BCCH is a channel of the RRC layer used to deliver MIB or system information. The CCCH may be used to transmit a common RRC message in a plurality of terminal devices 1. The CCCH may be used for the terminal device 1 which is not connected by RRC. The DCCH may be used at least to transmit a dedicated RRC message to the terminal device 1. The DCCH may be used for the terminal device 1 that is in RRC-connected mode.

The RRC message includes one or more RRC parameters (information elements). For example, the RRC message may include a MIB. For example, the RRC message may include system information (SIB: System Information Block, MIB). SIB is a generic name for various type of SIBs (e.g., SIB1, SIB2). For example, the RRC message may include a message which corresponds to a CCCH. For example, the RRC message may include a message which corresponds to a DCCH. RRC message is a general term for common RRC message and dedicated RRC message.

The BCCH in the logical channel may be mapped to the BCH or the DL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel may be mapped to a PUSCH in the physical channel. The DL-SCH in the transport channel may be mapped to a PDSCH in the physical channel. The BCH in the transport channel may be mapped to a PBCH in the physical channel.

A higher-layer parameter is a parameter included in an RRC message or a MAC CE (Medium Access Control Control Element). The higher-layer parameter is a generic name of information included in a MIB, system information, a message which corresponds to CCCH, a message which corresponds to DCCH, and a MAC CE.

A higher-layer parameter may be a cell-specific parameter or a UE-specific parameter. A cell-specific parameter is a parameter including a common configuration in a cell. A UE-specific parameter is a parameter including a configuration that may be configured differently for each UE.

The base station device may indicate change of cell-specific parameters by reconfiguration with random-access. The UE may change cell-specific parameters before triggering random-access. The base station device may indicate change of UE-specific parameters by reconfiguration with or without random-access. The UE may change UE-specific parameters before or after random-access.

The procedure performed by the terminal device 1 includes at least a part or all of the following 5A to 5C. The 5A is cell search. The 5B is random-access. The 5C is data communication.

The cell search is a procedure used by the terminal device 1 to synchronize with a cell in the time domain and/or the frequency domain and to detect a physical cell identity. The terminal device 1 may detect the physical cell ID by performing synchronization of time domain and/or frequency domain with a cell by the cell search.

A sequence of a PSS is given based at least on a physical cell ID. A sequence of an SSS is given based at least on the physical cell ID.

An SS/PBCH block candidate indicates a resource for which transmission of the SS/PBCH block may exist. An SS/PBCH block may be transmitted at a resource indicated as the SS/PBCH block candidate. The base station device 3 may transmit an SS/PBCH block at an SS/PBCH block candidate. The terminal device 1 may receive (detect) the SS/PBCH block at the SS/PBCH block candidate.

A set of SS/PBCH block candidates in a half radio frame is also referred to as an SS-burst-set. The SS-burst-set is also referred to as a transmission window, a SS transmission window, or a DRS transmission window (Discovery Reference Signal transmission window). The SS-burst-set is a generic name that includes at least a first SS-burst-set and a second SS-burst-set.

The base station device 3 transmits SS/PBCH blocks of one or more indexes at a predetermined cycle. The terminal device 1 may detect an SS/PBCH block of at least one of the SS/PBCH blocks of the one or more indexes. The terminal device 1 may attempt to decode the PBCH included in the SS/PBCH block.

The random-access is a procedure including at least a part or all of message 1, message 2, message 3, and message 4.

The message 1 is a procedure in which the terminal device 1 transmits a PRACH. The terminal device 1 transmits the PRACH in one PRACH occasion selected from among one or more PRACH occasions based on at least the index of the SS/PBCH block candidate detected based on the cell search.

The message 2 is a procedure in which the terminal device 1 attempts to detect a DCI format 1_0 with CRC (Cyclic Redundancy Check) scrambled by an RA-RNTI (Random Access-Radio Network Temporary Identifier). The terminal device 1 may attempt to detect the DCI format 1_0 in a search-space-set.

The message 3 is a procedure for transmitting a PUSCH scheduled by a random-access response grant included in the DCI format 1_0 detected in the message 2 procedure. The random-access response grant is indicated by the MAC CE included in the PDSCH scheduled by the DCI format 1_0.

The PUSCH scheduled based on the random-access response grant is either a message 3 PUSCH or a PUSCH. The message 3 PUSCH contains a contention resolution identifier MAC CE. The contention resolution ID MAC CE includes a contention resolution ID.

Retransmission of the message 3 PUSCH is scheduled by DCI format 0_0 with CRC scrambled by a TC-RNTI (Temporary Cell-Radio Network Temporary Identifier).

The message 4 is a procedure that attempts to detect a DCI format 1_0 with CRC scrambled by either a C-RNTI (Cell-Radio Network Temporary Identifier) or a TC-RNTI. The terminal device 1 receives a PDSCH scheduled based on the DCI format 1_0. The PDSCH may include a collision resolution ID.

Data communication is a generic term for downlink communication and uplink communication.

In data communication, the terminal device 1 attempts to detect a PDCCH (attempts to monitor a PDCCH, monitors a PDCCH). in a resource identified at least based on one or all of a control resource set and a search-space-set. It's also called as "the terminal device 1 attempts to detect a PDCCH in a control resource set", "the terminal device 1 attempts to detect a PDCCH in a search-space-set", "the terminal device 1 attempts to detect a PDCCH candidate in a control resource set", "the terminal device 1 attempts to detect a PDCCH candidate in a search-space-set", "the terminal device 1 attempts to detect a DCI format in a control resource set", or "the terminal device 1 attempts to detect a DCI format in a search-space-set". Monitoring a PDCCH may be equivalent as monitoring a DCI format in the PDCCH.

The control resource set is a set of resources configured by the number of resource blocks and a predetermined number of OFDM symbols in a slot.

The set of resources for the control resource set may be indicated by higher-layer parameters. The number of OFDM symbols included in the control resource set may be indicated by higher-layer parameters.

A PDCCH may be also called as a PDCCH candidate.

A search-space-set is defined as a set of PDCCH candidates. A search-space-set may be a Common Search Space (CSS) set or a UE-specific Search Space (USS) set.

The CSS set is a generic name of a type-0 PDCCH common search-space-set, a type-a PDCCH common search-space-set, a type-1 PDCCH common search-space-set, a type-2 PDCCH common search-space-set, and a type-3 PDCCH common search-space-set. The USS set may be also called as UE-specific PDCCH search-space-set.

The type-0 PDCCH common search-space-set may be used as a common search-space-set with index 0. The type-0 PDCCH common search-space-set may be an common search-space-set with index 0.

A search-space-set is associated with (included in, corresponding to) a control resource set. The index of the control resource set associated with the search-space-set may be indicated by higher-layer parameters.

For a search-space-set, a part or all of 6A to 6C may be indicated at least by higher-layer parameters. The 6A is PDCCH monitoring period. The 6B is PDCCH monitoring pattern within a slot. The 6C is PDCCH monitoring offset.

A monitoring occasion of a search-space-set may correspond to one or more OFDM symbols in which the first OFDM symbol of the control resource set associated with the search-space-set is allocated. A monitoring occasion of a search-space-set may correspond to resources identified by the first OFDM symbol of the control resource set associated with the search-space-set. A monitoring occasion of a search-space-set is given based at least on a part or all of PDCCH monitoring periodicity, PDCCH monitoring pattern within a slot, and PDCCH monitoring offset.

Figure 8:
FIG. 8 is a diagram showing an example of the monitoring occasion of the search-space-set according to an aspect of the present embodiment.

FIG. 8 is a diagram showing an example of the monitoring occasion of the search-space-set according to an aspect of the present embodiment. In FIG. 8, the search-space-set 91 and the search-space-set 92 are sets in the primary cell 301, the search-space-set 93 is a set in the secondary cell 302, and the search-space-set 94 is a set in the secondary cell 303.

In FIG. 8, the block indicated by the grid line indicates the search-space-set 91, the block indicated by the upper right diagonal line indicates the search-space-set 92, the block indicated by the upper left diagonal line indicates the search-space-set 93, and the block indicated by the horizontal line indicates the search-space-set 94.

In FIG. 8, the PDCCH monitoring periodicity for the search-space-set 91 is set to 1 slot, the PDCCH monitoring offset for the search-space-set 91 is set to 0 slot, and the PDCCH monitoring pattern for the search-space-set 91 is [1, 0, 0, 0, 0, 0, 0, 1, 0, 0, 0, 0, 0, 0]. That is, the monitoring occasion of the search-space-set 91 corresponds to the first OFDM symbol (OFDM symbol #0) and the eighth OFDM symbol (OFDM symbol #7) in each of the slots.

In FIG. 8, the PDCCH monitoring periodicity for the search-space-set 92 is set to 2 slots, the PDCCH monitoring offset for the search-space-set 92 is set to 0 slots, and the PDCCH monitoring pattern for the search-space-set 92 is [1, 0, 0, 0, 0, 0, 0, 0, 0, 0, 0, 0, 0, 0]. That is, the monitoring occasion of the search-space-set 92 corresponds to the leading OFDM symbol (OFDM symbol #0) in each of the even slots.

In FIG. 8, the PDCCH monitoring periodicity for the search-space-set 93 is set to 2 slots, the PDCCH monitoring offset for the search-space-set 93 is set to 0 slots, and the PDCCH monitoring pattern for the search-space-set 93 is [0, 0, 0, 0, 0, 0, 0, 1, 0, 0, 0, 0, 0, 0]. That is, the monitoring occasion of the search-space-set 93 corresponds to the eighth OFDM symbol (OFDM symbol #8) in each of the even slots.

In FIG. 8, the PDCCH monitoring periodicity for the search-space-set 94 is set to 2 slots, the PDCCH monitoring offset for the search-space-set 94 is set to 1 slot, and the PDCCH monitoring pattern for the search-space-set 94 is [1, 0, 0, 0, 0, 0, 0, 0, 0, 0, 0, 0, 0, 0]. That is, the monitoring occasion of the search-space-set 94 corresponds to the leading OFDM symbol (OFDM symbol #0) in each of the odd slots.

The type-0 PDCCH common search-space-set may be at least used for a DCI format with a cyclic redundancy check (CRC) sequence scrambled by an SI-RNTI (System Information-Radio Network Temporary Identifier).

The type-0a PDCCH common search-space-set may be used at least for a DCI format with a cyclic redundancy check sequence scrambled by an SI-RNTI.

The type-1 PDCCH common search-space-set may be used at least for a DCI format with a CRC sequence scrambled by an RA-RNTI (Random Access-Radio Network Temporary Identifier) or a CRC sequence scrambled by a TC-RNTI (Temporary Cell-Radio Network Temporary Identifier).

The type-2 PDCCH common search-space-set may be used for a DCI format with a CRC sequence scrambled by P-RNTI (Paging-Radio Network Temporary Identifier).

The type-3 PDCCH common search-space-set may be used for a DCI format with a CRC sequence scrambled by a C-RNTI (Cell-Radio Network Temporary Identifier).

The UE-specific search-space-set may be used at least for a DCI format with a CRC sequence scrambled by a C-RNTI.

In downlink communication, the terminal device 1 may detect a downlink DCI format. The detected downlink DCI format is at least used for resource assignment for a PDSCH. The detected downlink DCI format is also referred to as downlink assignment. The terminal device 1 attempts to receive the PDSCH. Based on a PUCCH resource indicated based on the detected downlink DCI format, an HARQ-ACK corresponding to the PDSCH (HARQ-ACK corresponding to a transport block included in the PDSCH) may be reported to the base station device 3.

In uplink communication, the terminal device 1 may detect an uplink DCI format. The detected uplink DCI format is at least used for resource assignment for a PUSCH. The detected uplink DCI format is also referred to as uplink grant. The terminal device 1 transmits the PUSCH.

Figure 9:
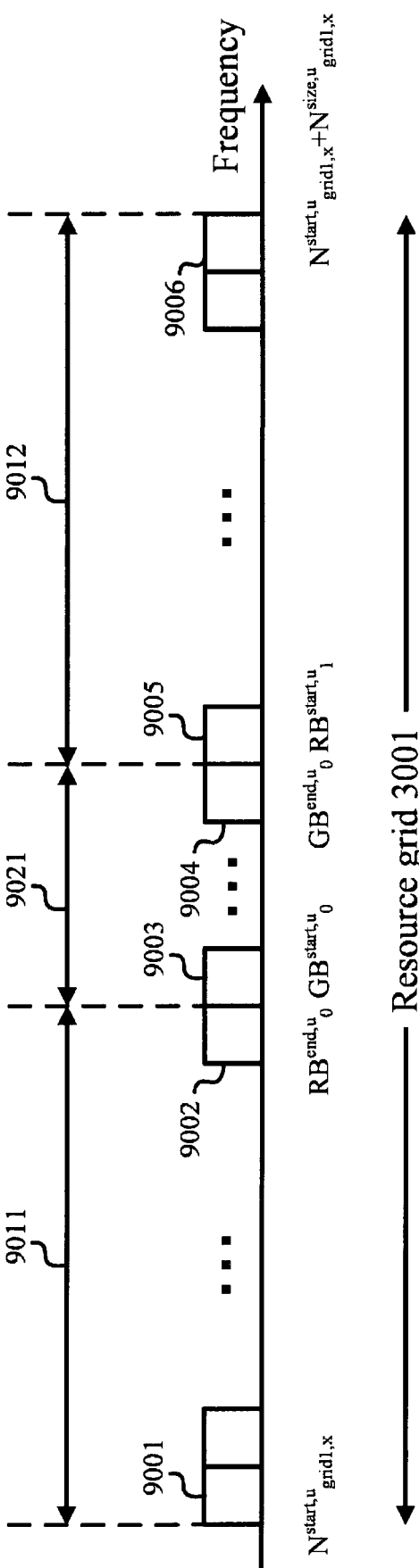
FIG. 9 is a configuration example of the transmission/reception unit 10 according to an aspect of the present embodiment.

FIG. 9 is a configuration example of the transmission/reception unit 10 according to an aspect of the present embodiment. In FIG. 9, the horizontal axis represents a frequency domain. Also, each block represents a resource block. Specifically, Resource block 9001 is a resource block with index $N^{start,u}_{grid1,x}$ where $N^{start,u}_{grid1,x}$ indicates a starting resource block for Resource grid 3001. Also, Resource block 9002 indicates a resource block with index $RB^{end,u}_{0}$. Also, Resource block 9003 indicates a starting resource block with index $GB^{start,u}_{0}$ for Guard band 9021 in Resource grid 3001. Also, Resource block 9004 indicates an ending resource block with index $GB^{end,u}_{0}$ for Guard band 9021 in Resource grid 3001. Also, Resource block 9005 indicates a starting resource block with index $RB^{start,u}_{1}$ for Frequency portion 9012. Also, Resource block 9006 indicates an ending resource block with index $N^{start,u}_{grid1,x}+N^{size,u}_{grid1,x}$ for Resource grid 3001.

A frequency portion with index s includes continuous resource blocks. The continuous resource blocks starts at $RB^{start,u}_{s}$ if the s is an positive integer, and starts at $N^{start,u}_{grid1,x}$ if the s is zero. The continuous resource blocks ends at $RB^{end,u}_{s}$ if the s is an integer which is not equal to $N_{por}-1$, and ends at $N^{start,u}_{grid1,x}+N^{size,u}_{grid1,x}$ if the s is equal to $N_{por}-1$. The $N_{por}$ indicates the number of frequency portions in Resource grid 3001. Possible value range for the s is from 0 to $N_{por}-1$. Frequency portions are also referred to as RB-sets.

Each of frequency portions is numbered in ascending order in the frequency domain. For example, in FIG. 9, the index of Frequency portion 9011 is 0. Also, the index of Frequency portion 9012 is 1.

An intra-cell guard band with index r includes continuous resource blocks. The continuous resource blocks starts at $GB^{start,u}_{r}$ and ends at $GB^{end,u}_{r}$. Possible value range for the r is from 0 to $N_{gar}-1$. The $N_{gar}$ indicates the number of intra-cell guard bands in Resource grid 3001.

Each of intra-cell guard bands is numbered in ascending order in the frequency domain. The number of intra-cell guard bands in Resource grid 3001 may be zero, one or more.

intra-cell guard bands in Resource grid 3001 may be also referred to as intra-carrier guard bands.

A position for each of intra-cell guard bands in Resource grid 3001 may be indicated or determined by a higher-layer parameter. For example, the higher-layer parameter may be a UE-specific parameter. In a case that the higher layer parameter is not provided to the terminal device 1, the terminal device may use default configuration for the intra-cell guard bands.

In a case that the terminal device 1 has detected SIB1, how to determine frequency portions may be an issue since SIB1 may not have information on intra-cell guard bands.

In first alternative, the terminal device 1 may determine frequency portions by the default configuration after SIB1 reception. For the first alternative, procedure may be different among terminal devices with different capabilities.

For example, the terminal device 1A may have Capability 1. The capability 1 indicates a capability of operation with single LBT sub-band in a wideband carrier. The LBT sub-band indicates a bandwidth for LBT (Listen Before Talk). The LBT is a procedure to sense a channel before transmission. For example, the bandwidth may correspond to 20 MHz. For example, the wideband carrier indicates a carrier larger than 20 MHz. For example, the wideband carrier indicates a carrier with multiple frequency portions.

For example, the terminal device 1B may have Capability 2. The capability 2 indicates a capability of operation with multiple LBT sub-bands in a wideband carrier without intra-cell guard bands. For example, Capability 2 may indicate that the terminal device 1B have a capability to operate with multiple frequency portions in a wideband carrier without intra-cell guard bands.

For example, the terminal device 1C may have Capability 3. Capability 3 indicates a capability of operation with multiple LBT sub-bands in a wideband carrier with one or more intra-cell guard bands. For example, Capability 3 may indicate that the terminal device 1C have a capability to operate with multiple frequency portions in a wideband carrier with one or more intra-cell guard bands.

In the first alternative, the terminal device 1C may determine positions of intra-cell guard bands and frequency portions by the default configuration after SIB1 reception. Further, the terminal device 1A and 1B may determine positions of frequency portions by the default configuration and may invalidate the intra-cell guard bands.

In second alternative, the terminal device 1 may determine a single frequency portion by the initial BWP configured by SIB1 after SIB1 reception. Further, in the second alternative, the terminal device 1 may determine a single frequency portion with the same size and the position as the initial BWP. The initial BWP may be the initial UL BWP or the initial DL BWP, or CORESET with index 0.

In third alternative, the terminal device 1 may determine frequency portions by the default configuration after SIB1 reception and invalidate some or all of intra-cell guard bands and some or all of the frequency portions. For the third alternative, procedure may be different among terminal devices with different capabilities.

In the third alternative, the terminal device 1A and 1B may invalidate all the intra-cell guard bands. Further, for DL, the terminal device 1A and 1B may invalidate all the frequency portions other than a single frequency portion in which at least some or all of a PDCCH, a SS/PBCH block or message 2 may be received. Further, for UL, the terminal device 1A and 1B may invalidate all the frequency portions other than a single frequency portion in which at least some or all of a PRACH or message 3 may be transmitted.

In the third alternative, the terminal device 1C may or may not invalidate any intra-cell guard bands. Further, the terminal device 1C may or may not invalidate any frequency portions.

After SIB1 reception, the terminal device 1 may configure a channel bandwidth corresponding to a maximum transmission bandwidth configuration based on a channel bandwidth supported by the terminal device 1.

For example, for a carrier with shared spectrum channel access, in a case that the carrier bandwidth indicated by SIB1 is larger than a bandwidth which corresponds to 20 MHz channel bandwidth, the terminal device 1 may apply, for the carrier, 20 MHz channel bandwidth.

For example, a bandwidth corresponds to 20 MHz channel bandwidth in a case that the bandwidth includes the number of resource blocks where the number is equal to the number of resource blocks for the maximum transmission bandwidth configuration corresponding to 20 MHz channel bandwidth. Also, a bandwidth corresponds to X MHz channel bandwidth in a case that the bandwidth includes the number of resource blocks where the number is equal to the number of resource blocks for the maximum transmission bandwidth configuration corresponding to X MHz channel bandwidth.

For example, a bandwidth corresponds to 20 MHz channel bandwidth in a case that the bandwidth includes the number of resource blocks where the number is smaller than the number of resource blocks for the maximum transmission bandwidth configuration corresponding to 20 MHz channel bandwidth. Also, a bandwidth corresponds to X MHz channel bandwidth in a case that the bandwidth includes the number of resource blocks where the number is smaller than the number of resource blocks for the maximum transmission bandwidth configuration corresponding to X MHz channel bandwidth.

For example, for a carrier with shared spectrum channel access, in a case that the carrier bandwidth indicated by SIB1 is equal to a bandwidth which corresponds to 20 MHz channel bandwidth, the terminal device 1 may apply, for the carrier, 20 MHz channel bandwidth.

For example, for a carrier with shared spectrum channel access, in a case that the carrier bandwidth indicated by SIB1 is equal to a bandwidth which corresponds to 10 MHz channel bandwidth, the terminal device 1 may apply, for the carrier, 10 MHz channel bandwidth.

For example, for a carrier with shared spectrum channel access, the terminal device 1 may determine, for the carrier, a channel bandwidth based on whether the carrier bandwidth indicated by SIB1 is equal to or larger than a bandwidth which corresponds to 20 MHz channel bandwidth or not.

For example, for a carrier with shared spectrum channel access, regardless of the carrier bandwidth configuration indicated by SIB1, the terminal device 1 may apply, for the carrier, a channel bandwidth which corresponds to the bandwidth of the initial BWP.

For example, procedure for channel bandwidth configuration may be different for terminal device capability. For example, for a carrier with shared spectrum channel access, in a case that the carrier bandwidth indicated by SIB1 is larger than a bandwidth which corresponds to 20 MHz channel bandwidth, the terminal device 1C may apply, for the carrier, a channel bandwidth with a maximum transmission bandwidth configuration 1) which is contained in the carrier bandwidth and 2) which is larger than or equal to bandwidth of the initial BWP.

Shared spectrum channel access may be a kind of channel access method for a shared spectrum. In the shared spectrum where multiple RATs or multiple network may operate on the shared spectrum, the shared spectrum channel access may be applied before transmission, the channel access method may at least include LBT.

Figure 10:
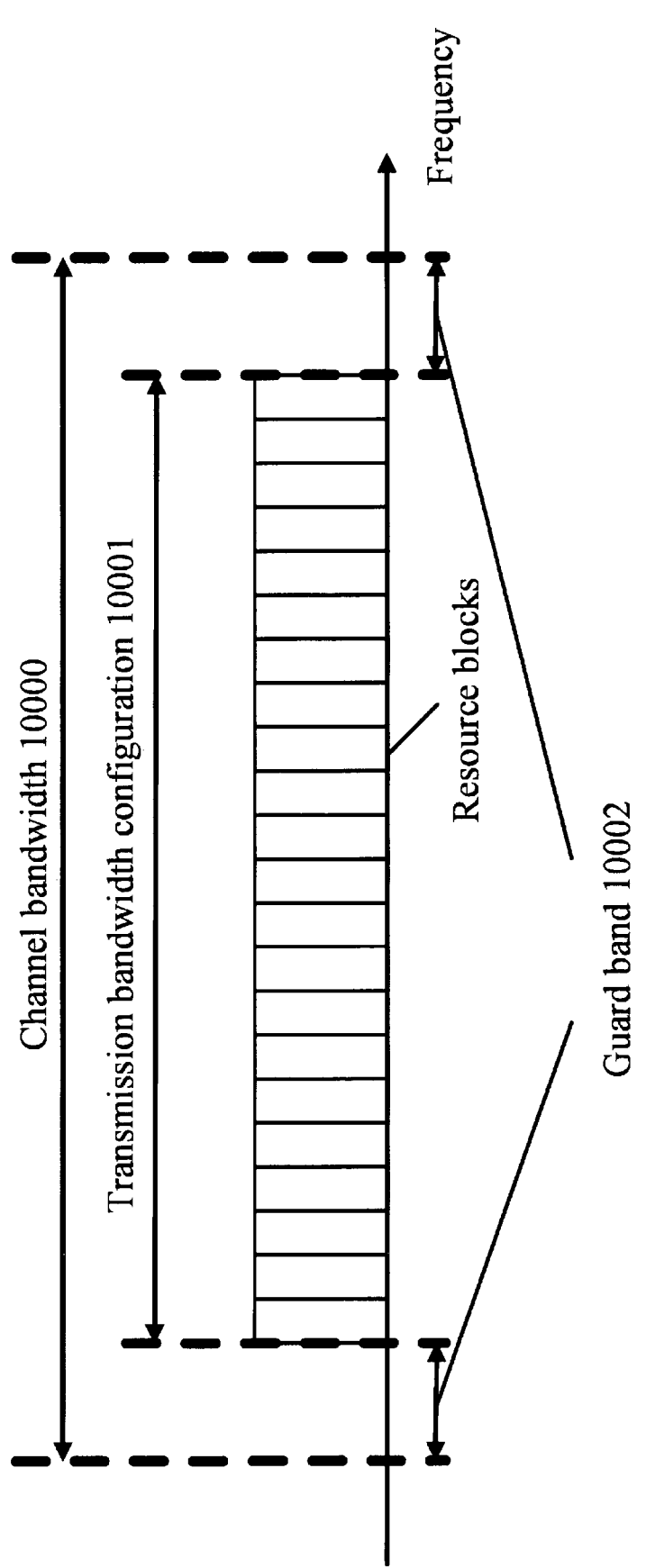
FIG. 10 is an example configuration of a channel bandwidth and a maximum transmission configuration according to an aspect of the present embodiment.

FIG. 10 is an example configuration of a channel bandwidth and a maximum transmission configuration according to an aspect of the present embodiment. In FIG. 10, horizontal axis indicates a frequency domain. Also, the channel bandwidth 10000 comprises of at least the transmission bandwidth configuration 10001 and the guard band 10002. The transmission bandwidth configuration 10001 is defined by the integer number of resource blocks. The guard band 10002 is configured outside the transmission bandwidth configuration 10001. The guard band 10002 is a gap for signal power attenuation for outside of the channel bandwidth 10000.

FIG. 11 is an example configuration of a table for a maximum transmission bandwidth configuration according to an aspect of the present embodiment. The maximum transmission bandwidth configuration is defined by the number $N_{RB}$ of resource blocks. For example, for 5 MHz channel bandwidth, $N_{RB}=25$ for 15 kHz SCS, $N_{RB}=11$ for 30 kHz SCS and $N_{RB}$ is undefined for 60 kHz SCS. For example, for 20 MHz channel bandwidth, $N_{RB}=106$ for 15 kHz SCS, $N_{RB}=51$ for 30 kHz SCS and $N_{RB}=24$ for 60 kHz SCS.

The transmission bandwidth configuration 10001 for the channel bandwidth 10000 may be configured such that the bandwidth of the transmission bandwidth configuration 10001 doesn't exceed the maximum transmission bandwidth configuration for the channel bandwidth 10000.

Transmission bandwidth configuration may correspond to a resource grid. For example, the transmission bandwidth configuration 10001 may correspond to Resource grid 3001.

Transmission bandwidth configuration may correspond to a carrier. Transmission bandwidth, resource grid, and carrier may correspond each other.

The terminal device may determine, based on the channel bandwidth, at least a part or all of transmission power, output power dynamics, transmit signal quality and spectrum emission mask.

In a case that intra-cell guard bands are configured for a carrier, a frequency portion configuration for a frequency portion may be configured. For example, in the default configuration for the intra-cell guard bands, a frequency portion configuration for the frequency portion 9011 may be 105 RBs, a frequency portion configuration for the frequency portion 9012 may be 105 RBs, and the intra-cell guard band 9021 may include 5 RBs. In a configuration other than the default configuration, the frequency portion configuration for the frequency portion 9011 may be 105 or not. In the configuration other than default configuration, a higher layer parameter may indicate the intra-cell guard band. In the default configuration, the intra-cell guard band may be predetermined.

For a carrier with one or more intra-cell guard bands, the terminal device may determine, based on the frequency portion configuration, at least a part or all of transmission power, output power dynamics, transmit signal quality and spectrum emission mask.

For a carrier with one or more intra-cell guard bands, the terminal device 1 may sense a channel on one or more LBT sub-bands in which a transmission is performed. For a carrier with no intra-cell guard bands, the terminal device 1 may sense a channel on one or more LBT sub-bands in the carrier. For a carrier with no intra-cell guard bands, the terminal device 1 may sense a channel on one or more LBT sub-bands in the active BWP.

In SIB1, the terminal device 1 may receive a configuration for LBT sub-bands. The configuration may have a functionality for switching the LBT operation after SIB1 reception. For example, the configuration may indicate that the terminal device 1 sense a channel on one or more LBT sub-bands in which a transmission is performed. For example, the configuration may indicate that the terminal device 1 sense a channel on one or more LBT sub-bands in a carrier. For example, the configuration may indicate that the terminal device 1 sense a channel on one or more LBT sub-bands in the active BWP. For example, the configuration may indicate that the terminal device 1 doesn't sense a channel before transmission.

Figure 12:
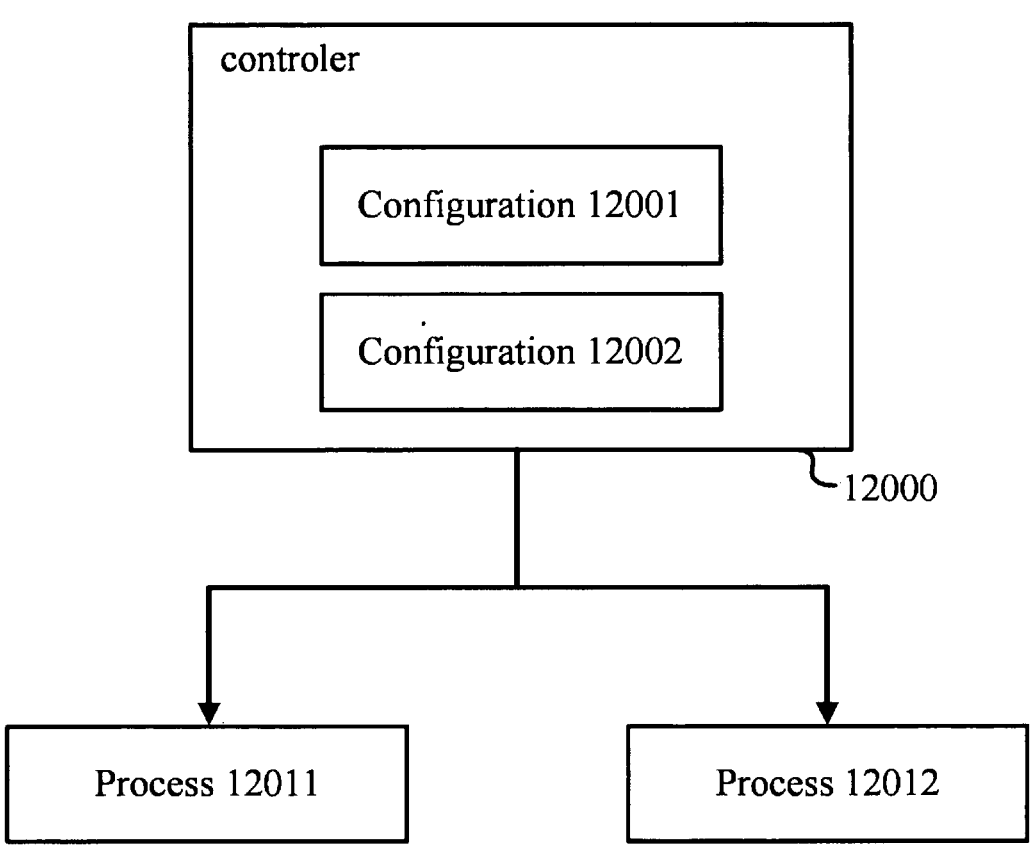
FIG. 12 is an example configuration of a controller 12000 in the terminal device 1 according to an aspect of the present embodiment.

FIG. 12 is an example configuration of a controller 12000 in the terminal device 1 according to an aspect of the present embodiment. The controller 12000 holds a configuration 12001 and a configuration 12002. The controller 12000 may control a process 12011 and a process 12012 based on how a PUSCH is scheduled.

For example, the controller 12000 may determine to use process 12011 for a PUSCH based on how the PUSCH is scheduled. For example, the controller 12000 may determine to use process 12012 for a PUSCH based on the PUSCH is scheduled.

For example, the configuration 12001 may be a first configuration of two or more first frequency portions within Resource grid 3001. Further, the one or more first frequency portions may be determined based on one or more first intra-cell guard bands within Resource grid 3001. Here, as shown in FIG. 9, Resource grid 3001 may be fully occupied by 1) the two or more first frequency portions and 2) the one or more first intra-cell guard bands. Further, the one or more first intra-cell guard bands may be indicated by a UE-specific parameter.

For example, the configuration 12002 may be a second configuration of two or more second frequency portions within Resource grid 3001. Further, the two or more frequency portions may be determined based on one or more second intra-cell guard bands within Resource grid 3001. Here, as shown in FIG. 9, Resource grid 3001 may be fully occupied by 1) the two or more second frequency portions and 2) the one or more second intra-cell guard bands. Further, the one or more second intra-cell guard bands may be derived from the default configuration. As described above, at least one frequency portion among the two or more first frequency portions may overlap at least with one or more of the two or more second frequency portions. At least one frequency portion among the two or more first frequency portions may overlap at least with one or more of the one or more second intra-cell guard bands. At least one intra-cell guard band among the one or more first intra-cell guard bands may overlap with at least one of the two or more second frequency portions. At least one intra-cell guard band among the one or more first intra-cell guard bands may overlap with at least one of the one or more second intra-cell guard bands.

For example, the configuration 12002 may be a second configuration of a second frequency portion within Resource grid 3001. The second frequency portion may be derived from the initial UL BWP. The second frequency portion may be derived from the active UL BWP. The second frequency portion may be derived from a control resource set with index 0. As described above, the second frequency portion may overlap at least with one of the two or more first frequency portions, the second frequency portion may overlap at least with one of the one or more first intra-cell guard bands.

For example, the process 12011 may be a resource determination process based on the configuration 12001. For example, the process 12012 may be a resource determination process based on the configuration 12002.

Figure 13:
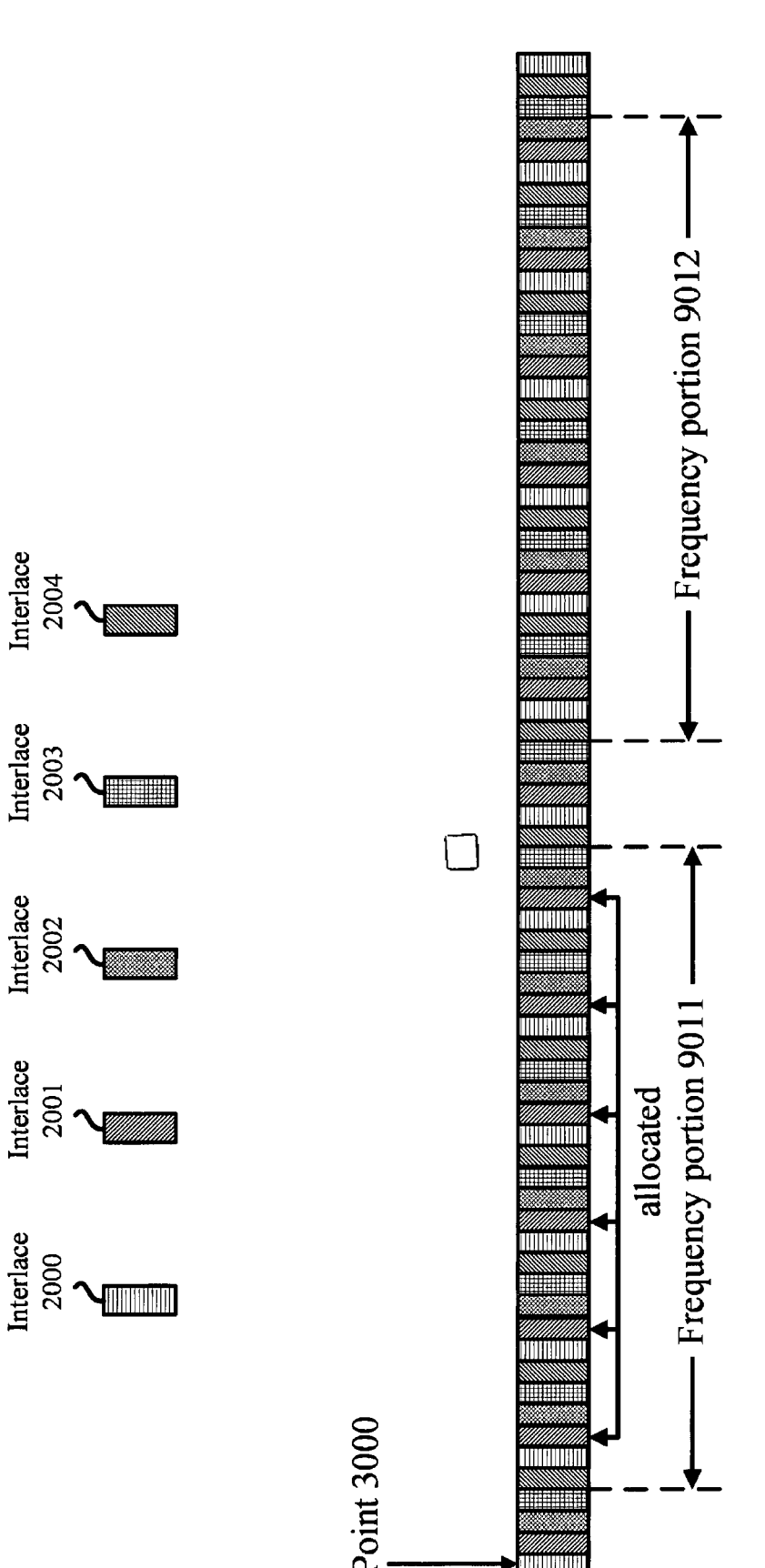
FIG. 13 is an example of resource allocation according to an aspect of the present embodiment.

FIG. 13 is an example of resource allocation according to an aspect of the present embodiment. The terminal device 1 determines the resource blocks for an uplink physical channel as an intersection of resource blocks in the interlace 2001 and resource blocks in Frequency portion 9011 as in FIG. 13. In FIG. 13, the interlace 2001 is assumed as the indicated interlace. Also, in FIG. 13, the resource blocks indicated as "allocated" is the result of the intersection of resource blocks the interlace 2001 and resource blocks in the frequency portion 9011.

For example, in a case that the PUSCH is scheduled by a DCI format 1_1 with a CRC sequence scrambled with a C-RNTI, resource blocks allocated for the PUSCH may be determined based on an intersection of 1) resource blocks of the indicated interlaces and 2) resource blocks in one or more frequency portions among the one or more first frequency portions. Further, the indicated interlaces may be indicated by the DCI format 1_1. Further, the one or more frequency portions may be indicated by a field (or a part of the field) in the DCI format 1_1. Further, a size of the field or the part of the field may be determined based on the number of first frequency portions in the active UL BWP.

For the terminal device 1 with a capability for enhanced resource allocation, resource blocks allocated for the PUSCH may be determined based on an intersection of 1) resource blocks of the indicated interlaces and 2) resource blocks within one or more frequency portions among the one or more first frequency portions. The resource blocks within the one or more frequency portions may correspond to resource blocks of the one or more frequency portions and resource blocks of zero or more intra-cell guard bands within the range of the one or more frequency portions.

For example, in a case that the PUSCH is scheduled by a DCI format 1_0 with a CRC sequence scrambled with a C-RNTI monitored in a UE-specific search-space-set, resource blocks allocated for the PUSCH may be determined based on an intersection of 1) resource blocks of the indicated interlaces and 2) resource blocks in one or more frequency portions among the one or more first frequency portions. Further, the indicated interlaces may be indicated by the DCI format 1_0. Further, the one or more frequency portions may be indicated by a field (or a part of the field) in the DCI format 1_0. Further, a size of the field or the part of the field may be determined based on the number of first frequency portions in the active UL BWP.

For example, in a case that the PUSCH is scheduled by a DCI format 1_0 with a CRC sequence scrambled with a C-RNTI monitored in a common search-space-set, resource blocks allocated for the PUSCH may be determined based on an intersection of 1) resource blocks of the indicated interlaces and 2) resource blocks in one or more frequency portions among the one or more second frequency portions. Further, the indicated interlaces may be indicated by the DCI format 1_0. Further, the one or more frequency portions may or may not be indicated by the DCI format 1_0. the one or more frequency portions may be determined based on a DL frequency portion in which a CCE with the lowest index in a PDCCH including the DCI format 1_0 is detected.

For example, in a case that the PUSCH is scheduled by a DCI format 1_0 with a CRC sequence scrambled with a C-RNTI monitored in a common search-space-set, resource blocks allocated for the PUSCH may be determined based on an intersection of 1) resource blocks of the indicated interlaces and 2) resource blocks in one or more frequency portions among the one or more first frequency portions if the one or more first frequency portions are configured to the terminal device 1. If the one or more first frequency portions are not configured to the terminal device 1, the one or more second frequency portions may be used instead of the one or more first frequency portions. Further, the indicated interlaces may be indicated by the DCI format 1_0. Further, the one or more frequency portions may or may not be indicated by the DCI format 1_0. the one or more frequency portions may be determined based on a DL frequency portion in which a CCE with the lowest index in a PDCCH including the DCI format 1_0 is detected.

For example, in a case that the PUSCH is scheduled by a DCI format 1_0 with a CRC sequence scrambled with a TC-RNTI monitored in a common search-space-set, resource blocks allocated for the PUSCH may be determined based on an intersection of 1) resource blocks of the indicated interlaces and 2) resource blocks in one or more frequency portions among the one or more second frequency portions. Further, the indicated interlaces may be indicated by the DCI format 1_0. Further, the one or more frequency portions may or may not be indicated by the DCI format 1_0. the one or more frequency portions may be determined based on a DL frequency portion in which a CCE with the lowest index in a PDCCH including the DCI format 1_0 is detected.

For example, the one or more frequency portions may be a frequency portion which corresponds to a DL frequency portion in which a CCE with the smallest index within a PDCCH with the DCI format is mapped in a case that the DCI format is monitored in a common-search-space and the DCI format is a DCI format 1_0.

For example, in a case that the PUSCH is scheduled by a random-access response grant, resource blocks allocated for the PUSCH may be determined based on an intersection of resource blocks of the indicated interlaces and resource blocks in a frequency portion in which the PRACH corresponding to the random-access response grant has been transmitted most recently where the frequency portion is selected among the one or more second frequency portions.

The PRACH corresponds to the random-access response grant in a case that the random-access preamble index indicated by the random-access response grant matches to an index of the random-access preamble transmitted by the PRACH.

The PUSCH is transmitted in the active UL BWP.

The initial UL BWP is a BWP to which a random-access procedure falls back to a default operation in certain condition. For example, in a case that a configuration for the random-access procedure is not provided for the active UL BWP, the terminal device switches the active UL BWP to the initial UL BWP and performs the random-access procedure in the UL BWP.

For example, in a case that the PUSCH is scheduled by a random-access response grant and in a case that 1) the active UL BWP includes all resource blocks in the initial UL BWP, 2) subcarrier spacing configuration of the active UL BWP is the same as the one of the initial UL BWP and 3) CP configuration of the active UL BWP is the same as the one of the initial UL BWP, resource blocks allocated for the PUSCH may be determined based on an intersection of resource blocks of the indicated interlaces and resource blocks in a frequency portion in which the PRACH corresponding to the random-access response grant has been transmitted most recently where the frequency portion is selected among the one or more second frequency portions.

For example, in a case that the PUSCH is scheduled by a random-access response grant and in a case that 1) the active UL BWP doesn't include at least one resource block in the initial UL BWP, 2) subcarrier spacing configuration of the active UL BWP is different from the one of the initial UL BWP or 3) CP configuration of the active UL BWP is different from the one of the initial UL BWP, resource blocks allocated for the PUSCH may be determined based on an intersection of resource blocks of the indicated interlaces and resource blocks in a frequency portion in which the PRACH corresponding to the random-access response grant has been transmitted most recently where the frequency portion is selected among the two or more first frequency portions.

To accomplish the object described above, aspects of the present invention are contrived to provide the following measures. Specifically, the terminal device 1 comprising configuration circuitry configured to configure one or more first intra-cell guard bands in a carrier based a first configuration, and configure two or more first RB-sets based on the intra-cell guard bands, reception circuitry configured to receive the first configuration, a DCI format with a CRC sequence scrambled by a C-RNTI and a PDSCH including a random-access response grant, and transmission circuitry configured to transmit a PUSCH in a second RB-set in an active UL BWP, wherein in a case that the PUSCH is scheduled by the DCI format, the second RB-set is selected among the two or more first RB-sets, and in a case that the PUSCH is scheduled by the random-access response grant, 1) the second RB-set is a third RB-set in which a PRACH corresponding to the random-access response grant has been transmitted and the third RB-set is configured based on a second configuration for one or more second intra-cell guard bands, the second configuration being different from the first configuration, 2) the transmission circuitry configured to determine the second RB-set such that the second RB-set is located in a bandwidth for an initial UL BWP in the active UL BWP, or 3) the transmission circuitry configured to determine the second RB-set such that the second RB-set is located in a bandwidth for a CORESET with index 0.

Furthermore, the base station device 3 according to a second aspect of the present invention includes configuration circuitry configured to configure one or more first intra-cell guard bands in a carrier based a first configuration, and configure two or more first RB-sets based on the intra-cell guard bands, transmission circuitry configured to transmit the first configuration, a DCI format with a CRC sequence scrambled by a C-RNTI and a PDSCH including a random-access response grant, and reception circuitry configured to receive a PUSCH in a second RB-set in an active UL BWP, wherein in a case that the PUSCH is scheduled by the DCI format, the second RB-set is selected among the two or more first RB-sets, and in a case that the PUSCH is scheduled by the random-access response grant, 1) the second RB-set is a third RB-set in which a PRACH corresponding to the random-access response grant has been transmitted and the third RB-set is configured based on a second configuration for one or more second intra-cell guard bands, the second configuration being different from the first configuration, 2) the transmission circuitry configured to determine the second RB-set such that the second RB-set is located in a bandwidth for an initial UL BWP in the active UL BWP, or 3) the transmission circuitry configured to determine the second RB-set such that the second RB-set is located in a bandwidth for a CORESET with index 0.

Each of a program running on the base station device 3 and the terminal device 1 according to an aspect of the present invention may be a program that controls a Central Processing Unit (CPU) and the like, such that the program causes a computer to operate in such a manner as to realize the functions of the above-described embodiment according to the present invention. The information handled in these devices is transitorily stored in a Random-Access-Memory (RAM) while being processed. Thereafter, the information is stored in various types of Read-Only-Memory (ROM) such as a Flash ROM and a Hard-Disk-Drive (HDD), and when necessary, is read by the CPU to be modified or rewritten.

Note that the terminal device 1 and the base station device 3 according to the above-described embodiment may be partially achieved by a computer. In this case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal device 1 or the base station device 3, and the computer system includes an OS and hardware components such as a peripheral device. Furthermore, the "computer-readable recording medium" refers to a portable medium such as a flexible disk, a magneto-optical disk, a ROM, a CD-ROM, and the like, and a storage device built into the computer system such as a hard disk.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station device 3 according to the above-described embodiment may be achieved as an aggregation (an device group) including multiple devices. Each of the devices configuring such an device group may include some or all of the functions or the functional blocks of the base station device 3 according to the above-described embodiment. The device group may include each general function or each functional block of the base station device 3. Furthermore, the terminal device 1 according to the above-described embodiment can also communicate with the base station device as the aggregation.

Furthermore, the base station device 3 according to the above-described embodiment may serve as an Evolved Universal Terrestrial Radio Access Network (E-UTRAN) and/or NG-RAN (Next Gen RAN, NR-RAN). Furthermore, the base station device 3 according to the above-described embodiment may have some or all of the functions of a node higher than an eNodeB or the gNB.

Furthermore, some or all portions of each of the terminal device 1 and the base station device 3 according to the above-described embodiment may be typically achieved as an LSI which is an integrated circuit or may be achieved as a chip set. The functional blocks of each of the terminal device 1 and the base station device 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case that with advances in semiconductor technology, a circuit integration technology with which an LSI is replaced appears, it is also possible to use an integrated circuit based on the technology.

Furthermore, according to the above-described embodiment, the terminal device has been described as an example of a communication device, but the present invention is not limited to such a terminal device, and is applicable to a terminal device or a communication device of a fixed-type or a stationary-type electronic device installed indoors or outdoors, for example, such as an Audio-Video (AV) device, a kitchen device, a cleaning or washing machine, an air-conditioning device, office equipment, a vending machine, and other household devices.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

The invention claimed is:

1. A terminal device comprising:

reception circuitry configured to detect a downlink control information (DCI) format for scheduling a physical uplink shared channel (PUSCH);

transmission circuitry configured to transmit the PUSCH; and control circuitry configured to determine whether to use a first process for the PUSCH or a second process for the PUSCH, at least, based on how the PUSCH is scheduled, wherein the first process is a resource determination process which is determined based on a first configuration of a plurality of first resource block (RB)-sets, the second process is a resource determination process which is determined based on a second configuration of a plurality of second RB-sets, the plurality of first RB-sets and one or more first intra-cell guard bands, which correspond to the plurality of first RB-sets, fully occupy a carrier, the plurality of second RB-sets and one or more second intra-cell guard bands, which correspond to the plurality of second RB-sets, fully occupy the carrier, in a case that the PUSCH is scheduled by the DCI format with a cyclic redundancy check (CRC) scrambled by a cell-radio network temporary identifier (C-RNTI) monitored in a common search space set:

resource blocks allocated for the PUSCH are determined based on an intersection of 1) resource blocks of interlaces and 2) resource blocks in one or more RB-sets, among one or more first RB-sets, if the one or more first RB-sets are configured to the terminal device, or the resource blocks allocated for the PUSCH are determined based on an intersection of 1) the resource blocks of the interlaces and 2) resource blocks in one or more RB-sets, among one or more second RB-sets, if the one or more first RB-sets are not configured to the terminal device, and in a case that the PUSCH is scheduled by the DCI format with a CRC scrambled by a temporary C-RNTI (TC-RNTI) in the common search space set, the resource blocks allocated for the PUSCH are determined based on the intersection of 1) the resource blocks of the interlaces and 2) the resource blocks in the one or more RB-sets, among the one or more second RB-sets.

2. A base station device comprising:

transmission circuitry configured to transmit a downlink control information (DCI) format for scheduling a physical uplink shared channel (PUSCH); and reception circuitry configured to receive the PUSCH based on a determination of a terminal device on whether to use a first process for the PUSCH or a second process for the PUSCH, at least, based on how the PUSCH is scheduled, wherein the first process is a resource determination process which is determined based on a first configuration of a plurality of first resource block (RB)-sets, the second process is a resource determination process which is determined based on a second configuration of a plurality of second RB-sets, the plurality of first RB-sets and one or more first intra-cell guard bands, which correspond to the plurality of first RB-sets, fully occupy a carrier, the plurality of second RB-sets and one or more second intra-cell guard bands, which correspond to the plurality of second RB-sets, fully occupy the carrier, in a case that the PUSCH is scheduled by the DCI format with a cyclic redundancy check (CRC) scrambled by a cell-radio network temporary identifier (C-RNTI) monitored in a common search space set:

resource blocks allocated for the PUSCH are determined based on an intersection of 1) resource blocks of interlaces and 2) resource blocks in one or more RB-sets, among one or more first RB-sets, if the one or more first RB-sets are configured to the terminal device, or the resource blocks allocated for the PUSCH are determined based on an intersection of 1) the resource blocks of the interlaces and 2) resource blocks in one or more RB-sets, among one or more second RB-sets, if the one or more first RB-sets are not configured to the terminal device, and in a case that the PUSCH is scheduled by the DCI format with a CRC scrambled by a temporary C-RNTI (TC-RNTI) in the common search space set, the resource blocks allocated for the PUSCH are determined based on the intersection of 1) the resource blocks of the interlaces and 2) the resource blocks in the one or more RB-sets, among the one or more second RB-sets.

3. A communication method performed by a terminal device, the communication method comprising:

detecting a downlink control information (DCI) format for scheduling a physical uplink shared channel (PUSCH);

transmitting the PUSCH; and determining whether to use a first process for the PUSCH or a second process for the PUSCH, at least, based on how the PUSCH is scheduled, wherein the first process is a resource determination process which is determined based on a first configuration of a plurality of first resource block (RB)-sets, the second process is a resource determination process which is determined based on a second configuration of a plurality of second RB-sets, the plurality of first RB-sets and one or more first intra-cell guard bands, which correspond to the plurality of first RB-sets, fully occupy a carrier, the plurality of second RB-sets and one or more second intra-cell guard bands, which correspond to the plurality of second RB-sets, fully occupy the carrier, in a case that the PUSCH is scheduled by the DCI format with a cyclic redundancy check (CRC) scrambled by a cell-radio network temporary identifier (C-RNTI) monitored in a common search space set:

resource blocks allocated for the PUSCH are determined based on an intersection of 1) resource blocks of interlaces and 2) resource blocks in one or more RB-sets, among one or more first RB-sets, if the one or more first RB-sets are configured to the terminal device, or the resource blocks allocated for the PUSCH are determined based on an intersection of 1) the resource blocks of the interlaces and 2) resource blocks in one or more RB-sets, among one or more second RB-sets, if the one or more first RB-sets are not configured to the terminal device, and in a case that the PUSCH is scheduled by the DCI format with a CRC scrambled by a temporary C-RNTI (TC-RNTI) in the common search space set, the resource blocks allocated for the PUSCH are determined based on the intersection of 1) the resource blocks of the interlaces and 2) the resource blocks in the one or more RB-sets, among the one or more second RB-sets.

* * * * *